(12) United States Patent
Ganzer et al.

(10) Patent No.: US 9,810,363 B2
(45) Date of Patent: Nov. 7, 2017

(54) BULK ADHESIVE TRANSFER DEVICES, KNIFE GATE VALVE DEVICES, AND RELATED SYSTEMS AND METHODS

(71) Applicant: Nordson Corporation, Westlake, OH (US)

(72) Inventors: Charles P. Ganzer, Cumming, GA (US); Enes Ramosevac, Snellville, GA (US); Ronald Ramspeck, Atlanta, GA (US); Raymond J. Slattery, III, Akron, OH (US); Leslie J. Varga, Cumming, GA (US)

(73) Assignee: Nordson Corporation, Westlake, OH (US)

( * ) Notice: Subject to any disclaimer, the term of this patent is extended or adjusted under 35 U.S.C. 154(b) by 36 days.

(21) Appl. No.: 14/490,362

(22) Filed: Sep. 18, 2014

(65) Prior Publication Data

US 2015/0075625 A1    Mar. 19, 2015

Related U.S. Application Data

(60) Provisional application No. 61/879,392, filed on Sep. 18, 2013.

(51) Int. Cl.
*F17D 3/01* (2006.01)
*F16L 53/00* (2006.01)
(Continued)

(52) U.S. Cl.
CPC ........ *F16L 53/001* (2013.01); *B05C 11/1031* (2013.01); *B05C 11/1042* (2013.01);
(Continued)

(58) Field of Classification Search
CPC ........... F17D 3/01; F17D 3/10; B05C 11/1031
(Continued)

(56) References Cited

U.S. PATENT DOCUMENTS

| 3,883,005 A | 5/1975 | Stevens |
| 4,532,961 A | 8/1985 | Walton et al. |

(Continued)

FOREIGN PATENT DOCUMENTS

| CN | 202343166 U | 7/2012 |
| DE | 2461696 A1 | 7/1976 |

(Continued)

OTHER PUBLICATIONS

Nordson Corporation, 1994 Adhesives and Sealants Equipment Catalog, Nordson Automatic Hopper/Feeder, 5 pgs.
(Continued)

*Primary Examiner* — Michael R Reid
*Assistant Examiner* — Christopher Ballman
(74) *Attorney, Agent, or Firm* — Baker & Hostetler LLP

(57) ABSTRACT

A bulk adhesive transfer system for transferring adhesive particulate to a melter includes a bulk supply and a transfer device, which may define a hopper of the melter, a mobile bin, and/or a buffer unit. The transfer device is configured to receive unmelted adhesive particulate from the bulk supply and then be selectively docked with the melter to transfer the adhesive particulate to the melter. The bulk adhesive transfer system may also include a knife gate valve device, which includes a plurality of ports that sequentially open and close to control flow of the adhesive particulate towards the melter. The bulk adhesive transfer system simplifies refilling operations for a melter while enabling continuous operation of the melter, even when the transfer device is undocked for removal from the melter.

12 Claims, 15 Drawing Sheets

(51) Int. Cl.
*F16K 3/02* (2006.01)
*F17D 3/10* (2006.01)
*B05C 11/10* (2006.01)
*B05C 11/11* (2006.01)
*B65B 69/00* (2006.01)

(52) U.S. Cl.
CPC ........... *B05C 11/1047* (2013.01); *B05C 11/11* (2013.01); *B65B 69/0091* (2013.01); *F16K 3/0281* (2013.01); *F17D 3/01* (2013.01); *F17D 3/10* (2013.01); *Y10T 137/0318* (2015.04); *Y10T 137/6416* (2015.04)

(58) Field of Classification Search
USPC .............. 141/274, 306; 222/165, 166, 146.5, 222/146.2
See application file for complete search history.

(56) References Cited

U.S. PATENT DOCUMENTS

| | | | |
|---|---|---|---|
| 4,545,504 A * | 10/1985 | Fabel | B05C 11/1042 219/388 |
| 4,790,455 A | 12/1988 | Dieringer et al. | |
| 4,919,308 A * | 4/1990 | Majkrzak | B05C 11/1042 126/343.5 A |
| 5,662,243 A * | 9/1997 | Bondeson | B29B 13/022 219/421 |
| 5,775,542 A * | 7/1998 | Field | F27D 99/00 141/82 |
| 5,791,830 A | 8/1998 | Fort et al. | |
| 5,909,829 A | 6/1999 | Wegman et al. | |
| 6,095,803 A | 8/2000 | Slater | |
| 6,196,417 B1 | 3/2001 | Johnson et al. | |
| 7,626,143 B2 | 12/2009 | Miller | |
| 2003/0121274 A1 | 7/2003 | Wightman | |
| 2005/0098579 A1 | 5/2005 | Dittmann et al. | |
| 2009/0095730 A1 | 4/2009 | Ganzer et al. | |
| 2014/0102858 A1 | 4/2014 | Chau et al. | |

FOREIGN PATENT DOCUMENTS

| | | |
|---|---|---|
| DE | 2720694 A1 | 11/1978 |
| DE | 8704215 U1 | 5/1987 |
| DE | 19602106 A1 | 7/1997 |
| GB | 156417 A | 1/1921 |
| GB | 2477973 A | 8/2011 |

OTHER PUBLICATIONS

Nordson Corporation, Adhesives and Sealants Equipment Guide (2001-2002), Vacuum Feed System, 12 pgs.
European Patent Office, Invitation to Pay Additional Fees in PCT Application Serial No. PCT/US2014/056376, dated Dec. 18, 2014 (6 pages).
European Patent Office, International Search Report and Written Opinion in PCT Application Serial No. PCT/US2014/056373, dated Mar. 19, 2015 (19 pages).
European Patent Application No. 16169040.9; Extended Search Report; dated Nov. 25, 2016; 8 pages.
China Patent Application No. 201480051758.6; Office Action; dated Mar. 2, 2017; 9 pages.

* cited by examiner

BULK ADHESIVE TRANSFER DEVICES, KNIFE GATE VALVE DEVICES, AND RELATED SYSTEMS AND METHODS

CROSS REFERENCE TO RELATED APPLICATIONS

This application claims the priority of U.S. Provisional Patent Application Ser. No. 61/879,392, filed on Sep. 18, 2013, the entire disclosure of which is hereby incorporated by reference herein.

TECHNICAL FIELD

The present invention generally relates to melters of hot melt adhesive systems and, more particularly, to transfer devices and systems for transferring bulk amounts of unmelted hot melt adhesive particulate, such as from bulk storage to a melt section, as well as valve devices and methods used with these devices and systems.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of solid or semi-solid pellets or pieces, which can be generally referred to as adhesive particulate(s). These hot melt adhesive particulates are melted into a liquid form by a melter, and the liquid hot melt adhesive is ultimately applied to an object such as a work piece, substrate or product by a dispensing device suitable to the application.

A supply of hot melt adhesive particulate must be maintained and delivered to the melter in order for the melter to produce the liquid hot melt adhesive used by the dispensing device. For example, it is known for a person to employ a scoop or bucket to retrieve hot melt adhesive particulates from a bulk supply, and to deliver those particulates to the melter. Typically, this involves filling a hopper or other container associated with the melter one scoop of hot melt adhesive particulate at a time. This requires the person to handle the hot melt adhesive particulate closely, which may be undesirable because hot melt adhesive dust may be stirred up during handling. In addition, transferring hot melt adhesive particulate in this manner is prone to waste caused by spillage, especially if the bulk supply is positioned away from the melter, in which case the person must hand-carry scoops of hot melt adhesive particulate from the bulk supply to the melter.

It is also known to use wheeled containers, such as trash can-like storage containers having two wheels at the rear thereof (referred to as totes or wheeled container), as intermediate storage containers for hot melt adhesive particulate used in the pneumatic transfer of the adhesive particulate to the melter. For example, hot melt adhesive particulate may be received from a supplier in a box, and then transferred by a person to the wheeled container. The person may then move the wheeled container to a suitable location. However, moving this type of wheeled container requires the operator to tilt the container backwardly and support the weight of the container in a balanced manner while moving. This requires that the person have sufficient strength and coordination to handle the wheeled container. Such an approach also requires a person to handle the adhesive materials closely when transferring the materials from the box to the wheeled container. This approach also has risks of waste caused by spillage, whether during the transfer into the wheeled container or when moving the container. For example, if such wheeled containers are not properly balanced during moving, the hot melt adhesive particulate contained therein could spill out. In an extreme case, such a wheeled container could tip over, causing substantial spillage of the hot melt adhesive particulate.

Therefore, there is a need for improvements in melters and bulk adhesive transfer devices and systems that address one or more of the drawbacks discussed above, especially those relating to handling and transferring hot melt adhesive material particulate, such as between bulk storage units and melters.

SUMMARY

Embodiments of the invention are directed to knife gate valve devices, bulk adhesive transfer devices, melters, and associated methods for controlling flow of adhesive particulates and/or supplying hot melt adhesive particulates to an adhesive melter. For example, in one embodiment a knife gate valve device is configured to be selectively operated so as to control the flow of hot melt adhesive particulate therethrough. The valve device includes a first plate having a plurality of first apertures and a second plate having a plurality of second apertures. The first and second plates are mounted for movement relative to one another so that the first and second apertures cooperate together by selectively aligning with one another to define a plurality of ports forming flow paths for the adhesive particulate through the valve device. The first and second plates move so as to sequentially open and sequentially close the plurality of ports during movement between open and closed positions.

The knife gate valve device in some embodiments includes first apertures each defining different opening sizes and second apertures each defining the same size, so as to enable the sequential opening and closing of the plurality of ports during relative movement of the first and second plates. The sequential opening and closing avoids multiplying the force or torque that must be applied to move the valve device between open and closed positions based on the adhesive particulate located within each of the plurality of ports. In another aspect, the second plate includes a handle so that an operator can manually rotate the second plate relative to the first plate between the open and closed positions. In some of these rotating plate embodiments of the valve, the first apertures include first aperture side edges and the second apertures include second aperture side edges angled differently than the first aperture side edges. As a result, when the first and second plates rotate relative to one another, the first and second aperture side edges pass over each other at an angle so as to define a scissor-like action for opening and closing the plurality of ports. The scissor-like opening and closing action tends to push adhesive particulate out of the way rather than pinching and splitting the adhesive particulate, which could lead to increased torque required to move the valve device between open and closed positions. The knife gate valve device may be incorporated into a bulk adhesive transfer system or a melter, in accordance with some aspects.

According to another embodiment of the invention, a method of controlling flow of adhesive particulate uses a knife gate valve device as described above. The method includes closing the knife gate valve device by moving the second plate relative to the first plate to a closed position in which the pluralities of first and second apertures are misaligned with one another to block flow of adhesive particulate. The knife gate valve device is opened by moving the second plate relative to the first plate to an open position in which each of the plurality of first apertures is aligned with a corresponding one of the plurality of second apertures, thereby forming a plurality of ports for adhesive particulate flow. The method also includes sequentially opening and sequentially closing the plurality of ports as the second plate moves relative to the first plate between the open and closed positions.

In another embodiment, a transfer device is configured to move adhesive particulate from a bulk supply to a melter. The transfer device includes a container configured to hold a supply of the adhesive particulate from the bulk supply and an outlet associated with container. The outlet is configured to be opened and closed to control flow of the adhesive particulate out of the container. A docking structure defines the outlet and is configured to selectively dock to at least one of: a part of the melter and an intermediate storage device proximate to the melter. The container and the outlet collectively define a moveable unit configured to be moved by an operator to the part of the melter or the intermediate storage device so as to selectively supply adhesive particulate to the melter, and configured to be moved away from the part of the melter or the intermediate storage device when the container is emptied of adhesive particulate by the melter. In one embodiment, the transfer device is part of the melter.

In one aspect, the container of the transfer device is a hopper of the melter, thereby enabling the hopper of the melter to be removed while the melter continues to operate to melt and supply liquid adhesive. It will be understood that the transfer device may be refilled at the bulk supply and re-docked to the melter after refilling, or alternatively, a different transfer device loaded with adhesive particulate may be docked in place of the original emptied transfer device. In another aspect, the transfer device also includes a framework supporting the container and including at least one wheel that enables rolling movement of the transfer device along a surface without requiring manual lifting of the adhesive particulate by the operator. This version of a transfer device collectively defines a mobile bin that may be selectively docked directly to a melter in some embodiments, and may be selectively docked to a buffer unit defining the intermediate storage device in other embodiments. Regardless of how the mobile bin is docked to structure at the melter, the mobile bin can advantageously be selectively removed for refilling or replacement while the melter continues to operate. The transfer device may be incorporated in a bulk adhesive transfer system and/or a melter.

In accordance with another embodiment, a melter is configured to supply liquid adhesive. The melter includes an inlet defining a docking structure configured to selectively dock to an outlet of a transfer device filled with adhesive particulate, and a melt section configured to receive adhesive particulate from the inlet. The melt section applies heat to the adhesive particulate to melt the adhesive particulate into liquid adhesive. The docking structure enables disconnection and removal of the transfer device from the inlet so that the transfer device may be replaced or refilled while the melt section continues operating.

Another embodiment of the invention provides a method for supplying adhesive particulate from a bulk supply to a melter using a transfer device as described above. To this end, the method includes moving the transfer device from the bulk supply towards the melter when the container is filled with adhesive particulate. The transfer device is aligned with an inlet of the melter, and the outlet is opened such that adhesive particulate is directed from the container and through the outlet towards the melter. For example, the outlet of the transfer device may be defined by a docking structure, and the alignment includes docking the transfer device to the melter.

According to still another embodiment of the invention, a method of providing unmelted hot melt adhesive particulates to a melter device is provided. The method includes directing unmelted hot melt adhesive particulates from a bulk supply to a mobile bin, and moving the mobile bin to a position above a buffer unit. The method further includes operating a valve on the mobile bin and allowing unmelted hot melt adhesive particulates to flow out of the mobile bin and into the buffer unit, and directing unmelted hot melt adhesive particulates from the buffer unit to the melter device.

According to another embodiment of the invention, a hot melt adhesive system is provided and includes a bulk supply containing a bulk amount of unmelted hot melt adhesive particulates, and a mobile bin configured to receive unmelted hot melt adhesive particulates from the bulk supply. The system further includes a buffer unit configured to receive unmelted hot melt adhesive particulates from the mobile bin and to hold a supply of unmelted hot melt adhesive particulates. The mobile bin and the buffer unit are configured such that the mobile bin is moved into position above the buffer unit to transfer unmelted hot melt adhesive particulates from the mobile bin to the buffer unit. The system further includes at least one hot melt adhesive melter device configured to melt unmelted hot melt adhesive particulates into a liquid hot melt adhesive material and being operatively coupled with the buffer unit.

According to another embodiment of the invention, a method of providing unmelted hot melt adhesive particulates to a melter device is provided. The method includes directing unmelted hot melt adhesive particulates from a bulk supply to a mobile bin, and moving the mobile bin to a position proximate to the melter device. The method further includes docking the mobile bin to the melter device, and directing unmelted hot melt adhesive particulates from the mobile bin to the melter device.

According to another embodiment of the invention, a hot melt adhesive system is provided and includes a bulk supply containing a bulk amount of unmelted hot melt adhesive particulates. The system further includes a mobile bin configured to receive unmelted hot melt adhesive particulates from the bulk supply, and at least one hot melt adhesive melter device configured to melt unmelted hot melt adhesive particulates into a liquid hot melt adhesive material. The mobile bin is further configured to be selectively docked to the melter device such that an outlet of the mobile bin is positioned proximate to an inlet of the melter device such that unmelted hot melt adhesive particulates can flow out of the outlet of the mobile bin and into the inlet of the melter device.

Various additional features and advantages of the invention will become more apparent to those of ordinary skill in the art upon review of the following detailed description of the illustrative embodiments taken in conjunction with the accompanying drawings.

BRIEF DESCRIPTION OF THE DRAWINGS

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION

Figure 1:
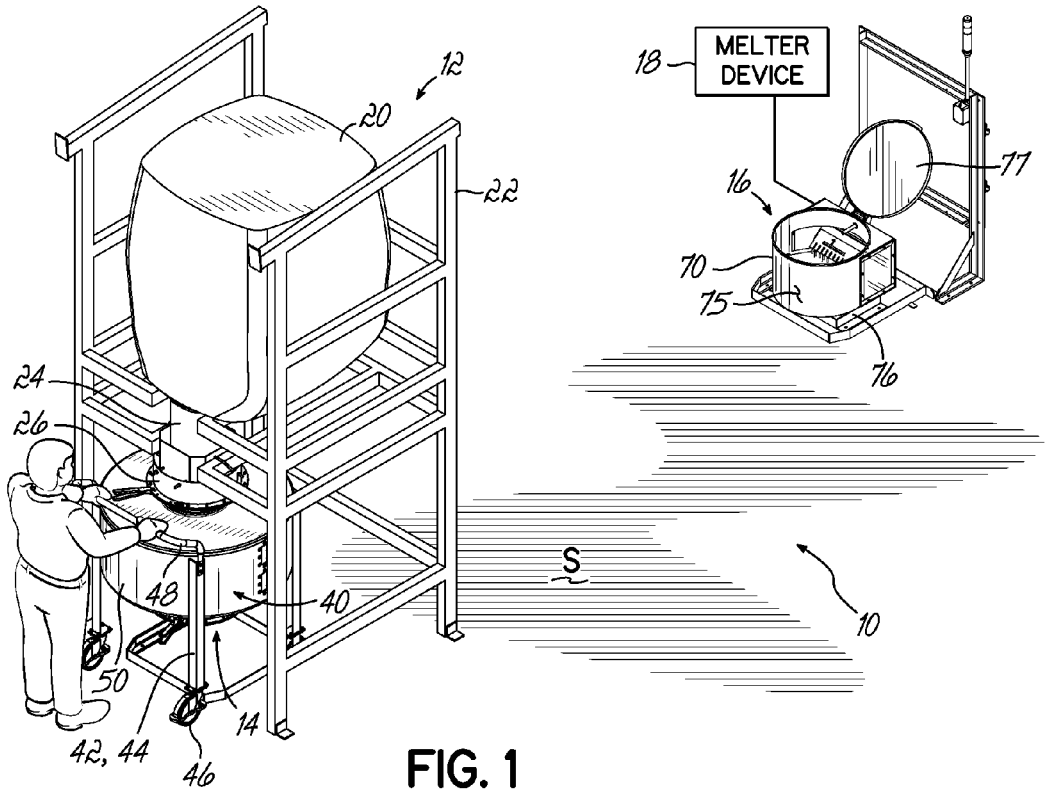
FIG. 1 is an isometric environmental view showing a bulk adhesive transfer system and device according to one embodiment, with a mobile bin positioned to receive adhesive particulates from a bulk supply.

Referring to FIGS. 1 through 4, a bulk adhesive transfer system 10 according to a first embodiment generally includes a bulk supply 12, a mobile bin 14, and a buffer unit 16. The mobile bin 14 serves as a first embodiment of a (bulk adhesive) transfer device for moving adhesive particulate, with this and other embodiments of the transfer device described in greater detail below. The bulk supply 12 is configured to contain a bulk amount of unmelted hot melt adhesive pieces and/or pellets (hereinafter "adhesive particulate(s)"). The buffer unit 16 is also configured to hold a supply of adhesive particulates, this supply typically being smaller than the amount stored within the bulk supply 12, and to supply those adhesive particulates to a hot melt adhesive melter device 18 (also referred to as a "melter," understood to include a hopper, a heating grid, a reservoir, a manifold and a liquid pump), which is operatively coupled with the buffer unit 16 and is configured to melt the adhesive particulates into a liquid hot melt adhesive material for use in an adhesive application. The adhesive particulates may be transported pneumatically from the buffer unit 16 to the melter device 18 as described below, although other methods of transfer between the buffer unit 16 and the melter device 18 are also possible in other embodiments. Together, the bulk adhesive transfer system 10 and the melter device 18 provide a hot melt adhesive system that supplies molten hot melt adhesive to downstream devices such as dispenser guns and modules (not shown). Advantageously, the bulk adhesive transfer system 10 of this and other embodiments simplifies the task of transferring large amounts of adhesive particulate between the bulk supply 12 and the melter device 18 by avoiding the use of manual scoops and/or trash can-like wheeled storage containers that may be inefficient or subject to spills. Moreover, the bulk adhesive transfer system 10 reduces the likelihood of adhesive contamination or operator exposure to the adhesive material.

Figure 2:
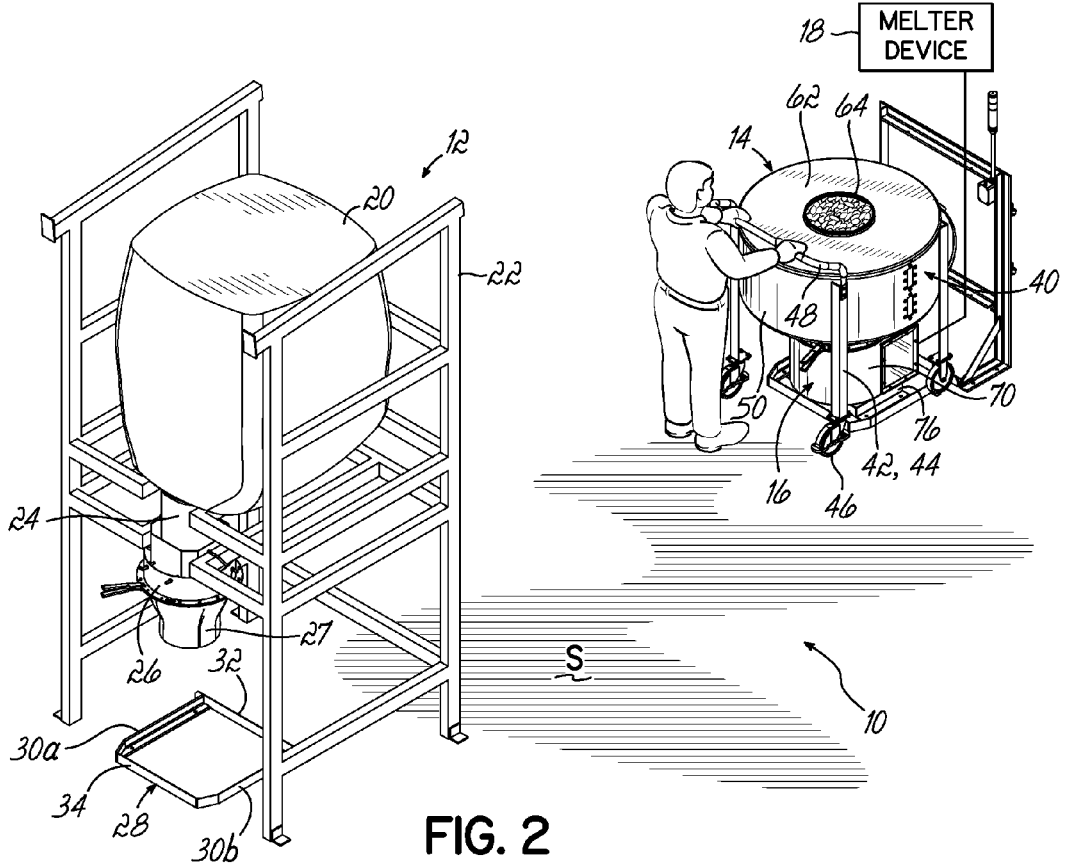
FIG. 2 is a further isometric environmental view of the bulk adhesive transfer system of FIG. 1, with the mobile bin positioned above a buffer unit for transferring adhesive particulates to the buffer unit.

As shown most generally in FIGS. 1 and 2, the mobile bin 14 is configured to allow adhesive particulate to be transferred between the bulk supply 12 and the buffer unit 16. For example, FIG. 1 shows the mobile bin 14 located underneath the bulk supply 12 for receiving a supply of adhesive particulate from the bulk supply 12, and FIG. 2 shows the mobile bin 14 moved to the buffer unit 16 for providing the adhesive particulate to the buffer unit 16. As shown in the FIGS. associated with this embodiment, an operator pushes or pulls the mobile bin 14 between the bulk supply 12 and the buffer unit 16. The mobile bin 14 is more stable and less prone to spills compared to conventional trash can-like storage container designs with two wheels and manual scoops, and these advantages and the mobile bin 14 are described in further detail below. Also as described in further detail below, the transfer device defined by the mobile bin 14 may be modified in other embodiments so as to be configured for docking directly to the melter device 18 rather than docking with an intermediate storage device such as the buffer unit 16.

The bulk supply 12 includes a container 20 supported by a frame 22. The container 20 is configured to hold, or contain, a bulk amount of adhesive particulate. For example, in the embodiment shown, the container 20 is in the form of a large flexible bag, such as a Super Sack® container. Other types of storage containers may be used in alternative embodiments of the bulk supply 12. Regardless of the type of container 20 used, the bulk supply 12 includes an outlet 24, and the adhesive particulate may be gravity fed to the outlet 24. Optionally, the container 20 may be reusable, and may be replenished with additional supplies of adhesive particulate, as may be required as the bulk amount of adhesive particulate therein is depleted.

Figure 4:
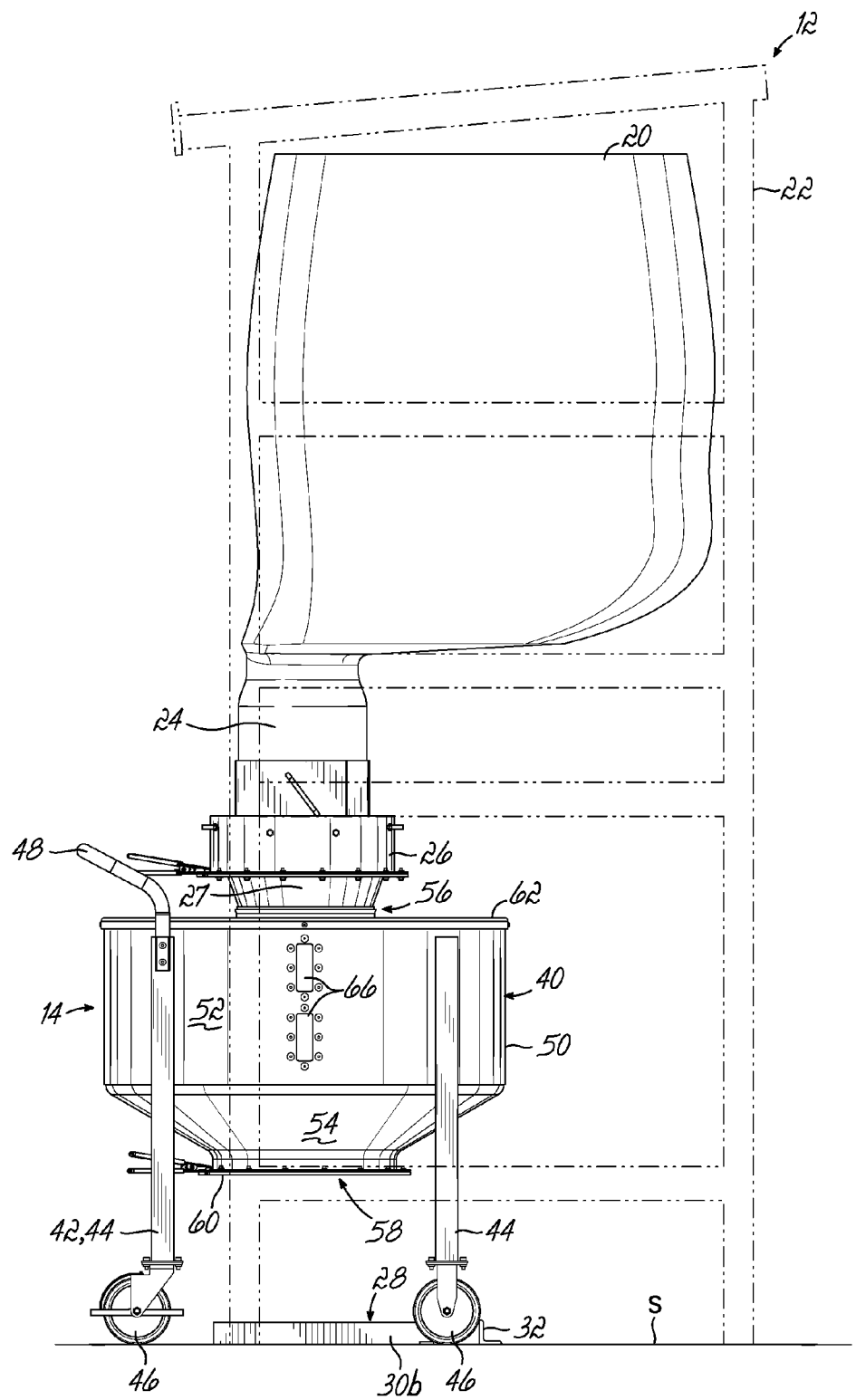
FIG. 4 is a side elevation view showing the bulk supply and mobile bin shown in FIG. 3 with the frame of the bulk supply shown in phantom.

The container 20 of the bulk supply 12 includes an outlet 24, and a valve 26 is associated with the outlet 24. The valve 26 is configured to selectively control the flow of adhesive particulates out of the container 20 through the outlet 24. The bulk supply 12 may also include a tapered transfer funnel 27 as shown in FIG. 4 configured to communicate between the valve 26 and an inlet of the mobile bin 14 as described below, although this funnel 27 may be omitted in other embodiments. The frame 22 is configured to support the container 20 in an elevated position above a surface S (such as a floor surface). In particular, the frame 22 supports the container 20 such that the mobile bin 14 can be moved into a position beneath the container 20, as shown in FIG. 1. In that position, the valve 26 can be opened to allow adhesive particulates to be transferred from the container 20 to the mobile bin 14, such as by gravity feed.

Optionally, an alignment guide 28 (most easily seen in FIG. 2) is associated with the bulk supply 12 to aid in aligning the mobile bin 14 with respect to the outlet 24 of the container 20 and with respect to the valve 26. While different alignment guides may be used, one example of an alignment guide 28 is shown positioned on the surface S generally beneath the outlet 24 and includes side rails 30a, 30b, a stop rail 32, and a front rail 34. The alignment guide 28 is sized to interact with wheels 46 on the mobile bin 14 in order to guide the movement of the mobile bin 14 to the preferred location (e.g., with a top opening of the mobile bin 14 directly beneath the valve 26). To this end, the alignment guide 28 simplifies the positioning and operation of the mobile bin 14 and the bulk adhesive transfer system 10 for the operator.

In this embodiment, the mobile bin 14 is configured to receive adhesive particulate from the bulk supply 12, and to transfer and deliver those adhesive particulate to the buffer unit 16. Referring particularly to FIGS. 3 through 7, the mobile bin 14 includes a container 40 supported by a framework 42. In the embodiment shown, the framework 42 has four legs 44, each of which is coupled with the container 40. Each of the legs 44 is an L-shaped bracket configured to be adhered or welded into engagement with an outer periphery of the container 40. The framework 42 includes at least one wheel 46, and in the embodiment shown includes four wheels 46. More specifically, each leg 44 is associated with a wheel 46. The wheels 46 shown in the FIGS. are caster wheels configured to roll alongside the side rails 30a, 30b of the alignment guide 28 when the mobile bin 14 is positioned at the bulk supply 12, but other types of wheels may also be used in other embodiments. The wheels 46 allow the mobile bin 14 to be rolled on the surface S, such as between the bulk supply 12 and the buffer unit 16. A push handle 48 is coupled with the framework 42, and provides an ergonomic gripping point for the operator to manipulate and move the mobile bin 14 along the surface S. Therefore, as shown in FIGS. 1 and 2 and described above, the mobile bin 14 is designed for operator movement without necessitating tipping or balancing of a load of adhesive particulate held within the container 40.

The container 40 includes a body 50 having a generally drum shaped first portion 52 and a generally inwardly tapered second portion 54 extending downwardly therefrom. The drum shaped first portion 52 is generally cylindrical between an open top of the container 40 and the tapered second portion 54. The container 40 defines an inlet 56 formed in an upper region of the first portion 52 and an outlet 58 formed in a lower region of the second portion 54. The inlet 56 is configured to receive adhesive particulate from the bulk supply 12 and the outlet 58 is configured to communicate adhesive particulate from the container 40 to the buffer unit 16 in this embodiment. The body 50 is configured to direct adhesive particulates toward the outlet 58. Similar to the valve 26 provided at the outlet 24 of the bulk supply 12, a valve 60 is associated with the outlet 58 of the container 40 to selectively control the flow of adhesive particulate out of the mobile bin 14.

Figure 3:
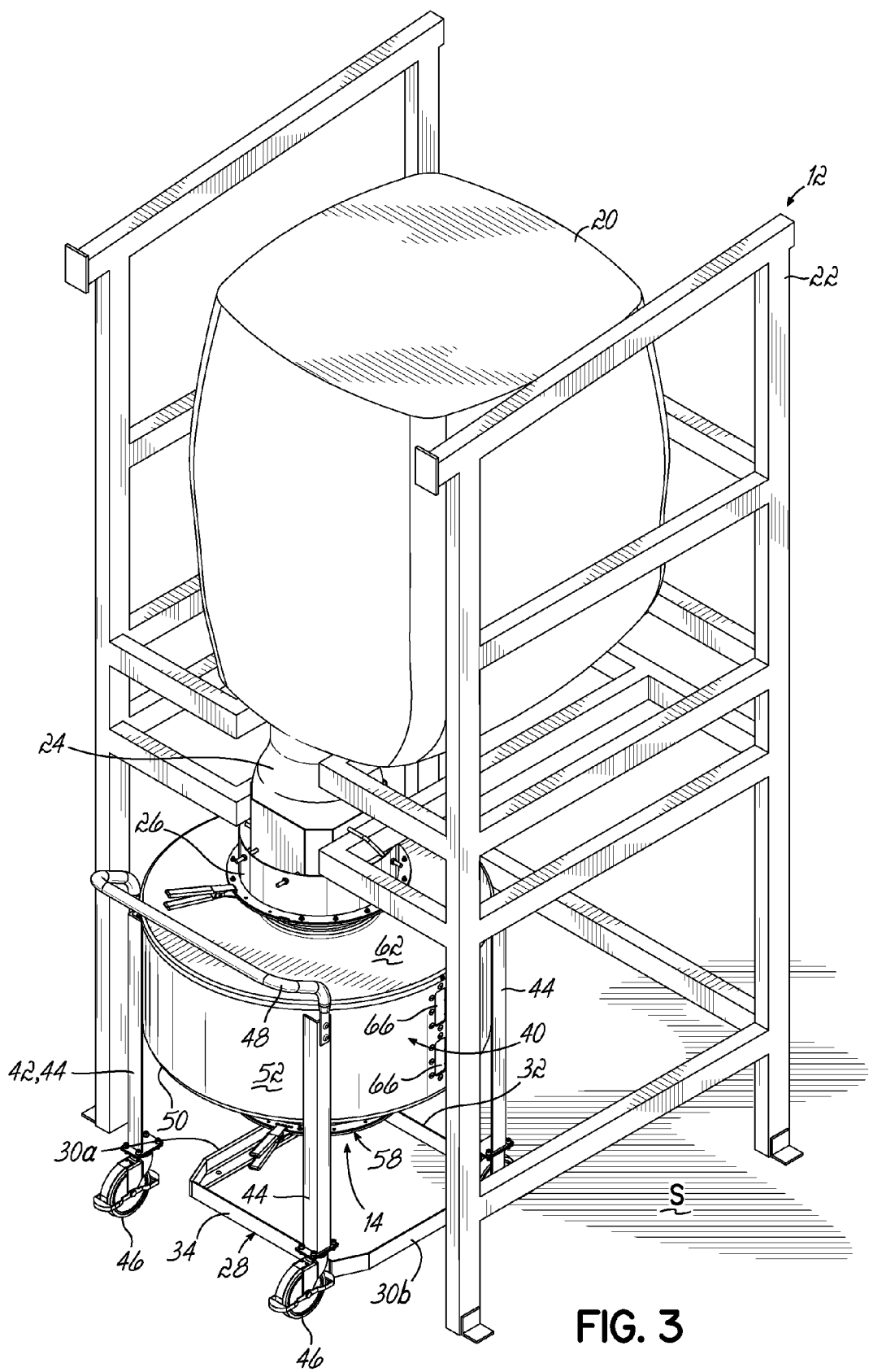
FIG. 3 is an isometric view showing the bulk supply and mobile bin of FIG. 1.
Figure 5:
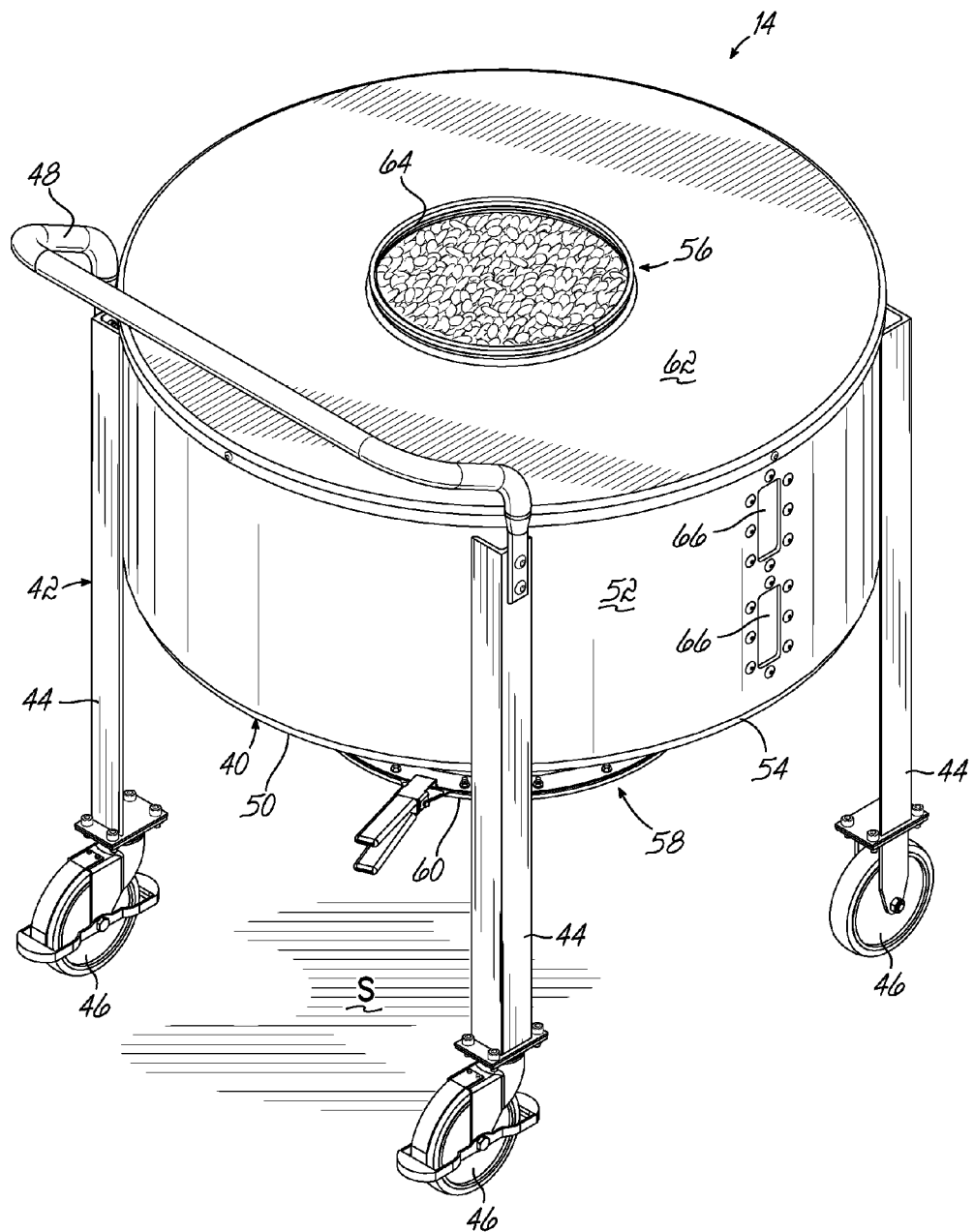
FIG. 5 is an isometric view showing the mobile bin of FIG. 1.
Figure 6:
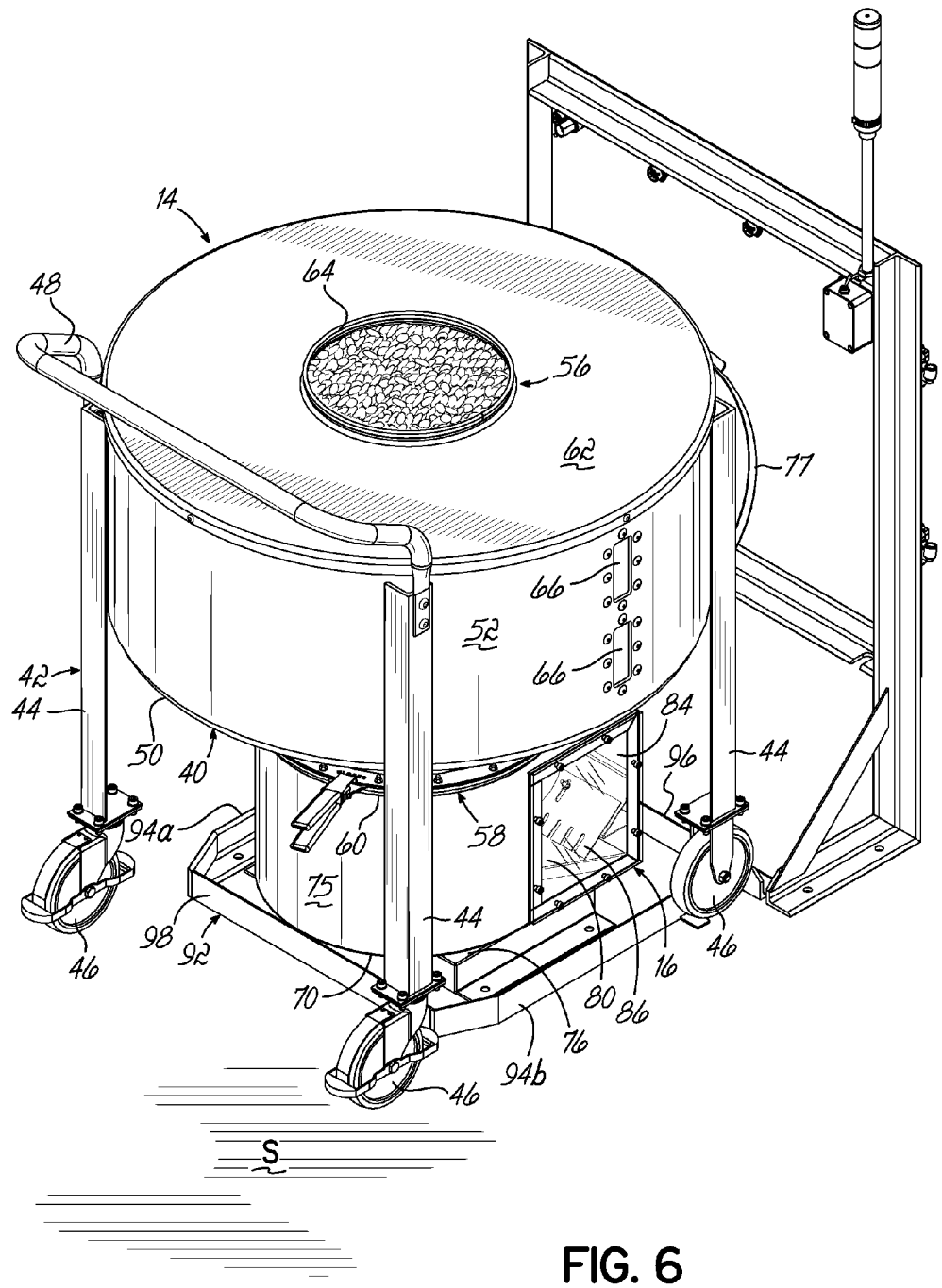
FIG. 6 is an isometric view showing the mobile bin and buffer unit of FIG. 1.

As shown in FIGS. 3 through 5, the container 40 also includes a lid 62 with a port 64 formed therein (closing off a substantial portion of the open top of the container 40). The port 64 generally serves as the inlet 56 to the container 40 and is generally sized to match the cross-section of the tapered transfer funnel 27 extending from the valve 26 on the bulk supply 12. Optionally, the container 40 can include one or more viewing windows 66 that allow the level or amount of adhesive particulates in the container 40 to be viewed. In this regard, the viewing windows 66 enable an operator to evaluate how much adhesive particulate is in the mobile bin 14 so that the mobile bin 14 can be moved back to the bulk supply 12 to refill the container 40, when necessary (and so as to avoid letting the buffer unit 16 run out of adhesive particulate while the mobile bin 14 is being refilled as well).

Therefore, a first part of the operation of the bulk adhesive transfer system 10 is shown in FIGS. 3 and 4. To this end, the mobile bin 14 is moved by an operator to a position to receive adhesive particulate from the bulk supply 12, such as when the mobile bin 14 is empty. In particular, the mobile bin 14 is positioned beneath the outlet 24 of the container 20 of the bulk supply 12. During this movement of the mobile bin 14, the alignment guide 28 helps align the mobile bin 14, with the wheels 46 moving along the outermost sides of the side rails 30a, 30b until the front most of the wheels 46 contact the stop rail 32. As will be readily understood from the view in FIG. 4, the stop rail 32 is specifically tailored to the mobile bin 14 being used and is positioned at a location along the surface S where the front most wheels 46 must stop in order to correctly align the port 64 of the container 40 and the outlet 24 of the bulk supply 12. Once the mobile bin 14 is appropriately positioned, the valve 26 is opened to direct adhesive particulate from the container 20 of the bulk supply 12 into the container 40 of the mobile bin 14. In particular, adhesive particulate are allowed to flow out of the outlet 24 of the container 20 and into the port 64 in the lid 62 of the container 40. The valve 26 is then closed to stop the flow of adhesive particulate out of the container 20 when the mobile bin 14 has been filled with adhesive particulate. The valve 26 is preferably provided with multiple ports that sequentially open and close with a scissor-like interface at the ports to reliably ensure flow of adhesive particulate through the valve 26 when opened and to reliably cut through a column of stacked adhesive particulate without jamming or blocking during closing. One exemplary embodiment of the valve 26 and its specific operational functionality is described below in connection with FIGS. 9 through 11D. The mobile bin 14 advantageously provides an easier and more reliable mechanism for helping an operator transfer adhesive particulate between a bulk supply 12 located remote from a melter device 18 and a buffer unit 16 located closer to the melter device 18.

Figure 7:
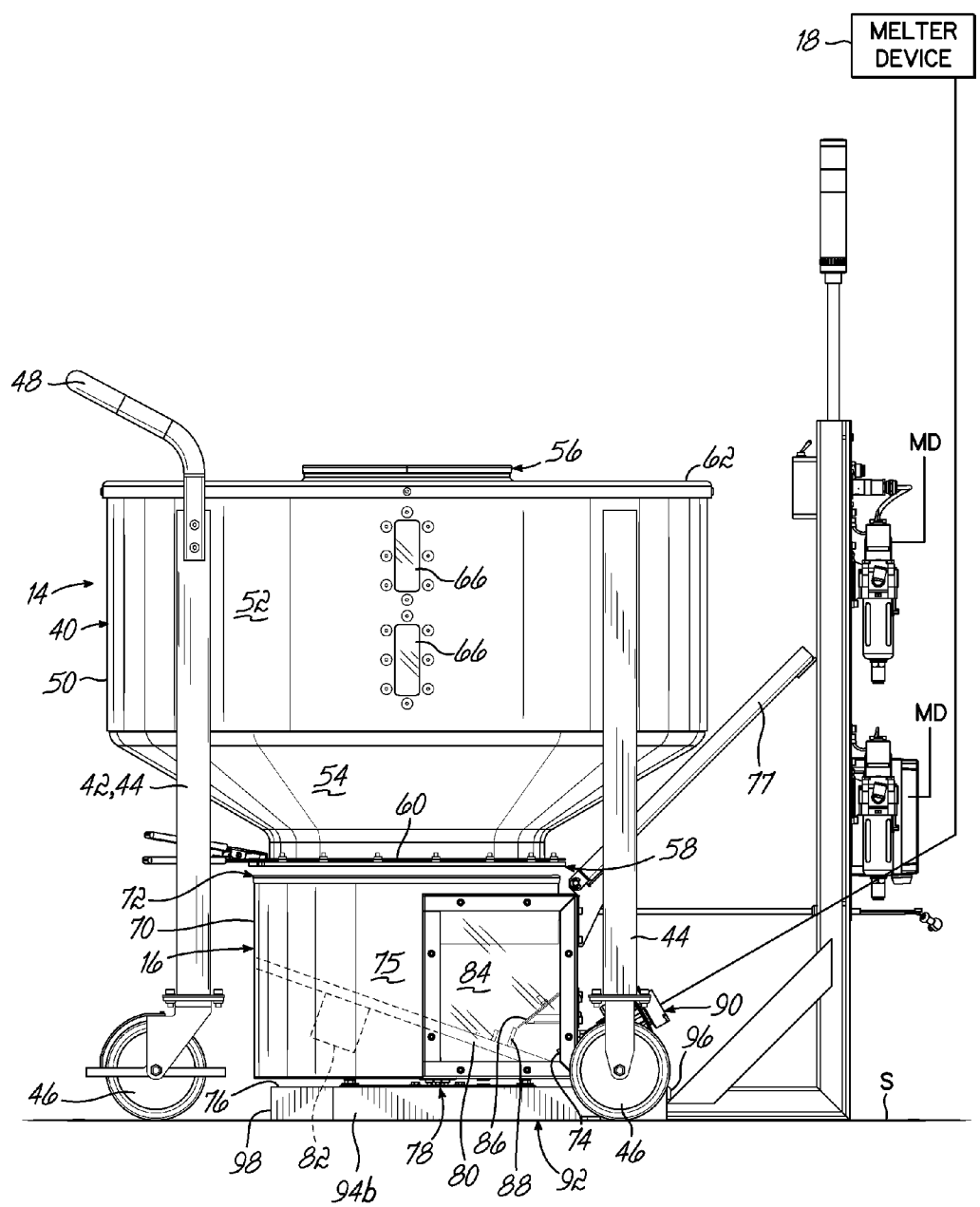
FIG. 7 is a side elevation view showing the mobile bin and buffer unit of FIG. 6.

Now with reference to FIGS. 6 through 8B, the buffer unit 16 is configured to receive and hold a supply of adhesive particulate from the mobile bin 14, and to provide those adhesive particulate to the melter device 18 on demand. The buffer unit 16 includes a buffer bin 70 having an inlet 72 and at least one outlet 74. The inlet 72 is configured to receive adhesive particulate from the mobile bin 14, and the at least one outlet 74 is operatively coupled with the melter device 18 to provide the adhesive particulate thereto. For example, the at least one outlet 74 may be used to feed one or more melters or melter devices 18 depending on the specific installation of the adhesive dispensing/supply system incorporating the bulk adhesive transfer system 10. In FIG. 7, the melter device 18 is shown as a schematic black box, although it will be understood that one example of a melter device 18 is shown in the wall-mounted melter and dispenser units MD located in close relation to the buffer unit 16 (and the at least one outlet 74 could be connected to these melter and dispenser units MD by hosing or other conduits, not shown).

The buffer bin 70 includes a housing 75 having a generally D-shaped cross section along its length from top to bottom, with the housing 75 supported so as to be positioned above a platform 76 situated on the surface S. The buffer bin 70 may also include a lid member 77 pivotally coupled to the housing 75 and configured to move between an open position (shown in FIGS. 1 and 7) providing access into the interior of the buffer bin 70 through the open top and a closed position (not shown) which blocks access into the buffer bin 70. Generally, when the mobile bin 14 is moved away from the buffer unit 16 as shown in FIG. 1, the lid member 77 will be moved to the closed position to avoid having any operator exposure to the adhesive particulate or contamination of the adhesive particulate remaining in the buffer bin 70.

The buffer bin 70 is configured to be mated with the container 40 of the mobile bin 14. To this end, the buffer bin 70 may include a lift mechanism 78 associated with the platform 76 and that is configured to move the buffer bin 70 upwardly into contacting engagement with the container 40, as described below in connection with FIG. 8B. In the exemplary embodiment shown, the lift mechanism 78 includes at least one compression spring 78a biasing the buffer bin 70 upwardly away from the platform 76 towards a raised position (FIG. 8B) and an air cylinder 78b that may be actuated to push the buffer bin 70 into the lowered position (FIG. 8A) against the bias of the at least one compression spring 78a. Alternatively, the mobile bin 14 could include a mechanism for moving the container 40 downwardly into contacting engagement with the buffer bin 70 in other embodiments. Regardless of whether the buffer unit 16 or the mobile bin 14 includes the movement mechanism, the buffer bin 70 is configured to be spaced apart from the container 40 when the mobile bin 14 is moving into or out of position relative to the buffer bin 70, and then configured to be engaged with the container 40 once these elements are aligned and properly positioned.

The buffer bin 70 includes a sloped internal plate 80 surrounded by the housing 75 and configured to direct adhesive particulate contained therein toward the at least one outlet 74. Optionally, an agitation device 82 may be operatively coupled with the sloped internal plate 80 for agitating adhesive particulates thereon to cause flow of the fluidized adhesive particulate down the sloped internal plate 80 and towards the at least one outlet 74. In some embodiments, the agitation device 82 may be configured to vibrate the sloped internal plate 80, although other types of agitation may also be used in other embodiments of the buffer bin 70.

Similar to the container 40 of the mobile bin 14, the buffer bin 70 also includes one or more viewing windows 84 that allow the level or amount of adhesive particulate in the buffer bin 70 to be viewed. It will be understood that the buffer bin 70 may also include a level sensor (not shown) for providing an indication to the operator when the level of adhesive particulate in the buffer bin 70 is low and needs refilling. Also, the buffer bin 70 includes a flow control plate 86 (visible through the window 84 in FIGS. 6 through 8B and also referred to as a gate plate) which is positioned near the at least one outlet 74 to control the amount of adhesive particulate that can flow down to the space directly adjacent the at least one outlet 74. The flow control plate 86 is moveable relative to the sloped internal plate 80 so as to adjust the gap between these elements and thereby further adjust the amount of flow permitted from the main portion of the buffer bin 70 into the space adjacent the at least one outlet 74. Proximate to the flow control plate 86, the sloped internal plate 80 includes a plurality of rows of pins 88 extending upwardly from the sloped internal plate 80 (three rows of pins 88 are shown of varying lengths, but it will be understood that more or fewer rows of pins 88 may be used in other embodiments and the lengths may be varied from those shown) to divide the flow of adhesive particulate as it moves towards the gap between the flow control plate 86 and the sloped internal plate 80. This division of the flow of adhesive particulate, along with the vibration/agitation generated in the adhesive particulate, collectively encourages clumps of coalesced and/or stuck-together adhesive particulate to break apart before delivery to the at least one outlet 74. Accordingly, only small particles (e.g., a fluidized adhesive particulate) are delivered into the at least one outlet 74 to avoid clogging of pneumatic pumps coupled to the at least one outlet 74 of the buffer bin 70 with excessive adhesive particulate in the embodiment shown.

Optionally, the buffer unit 16 can further include a pneumatic transfer pump 90 (or some other analogous element) configured for moving adhesive particulate from the at least one outlet 74 to the melter device 18. In this regard, the pneumatic transfer pump 90 uses pressurized air to produce vacuum and positive pushing forces that move adhesive particulate out of a storage device (in this case, the buffer bin 70) and through hosing or some other conduit leading directly to the melter device 18 as well understood in the adhesive dispensing art. Also optionally, an alignment guide 92 can be associated with the buffer unit 16 to aid in aligning the mobile bin 14 with respect to the buffer bin 70. While different alignment guides may be used, one example of an alignment guide 92 is shown positioned on the surface S generally surrounding the platform 76 and includes side rails 94a, 94b, a stop rail 96, and a front rail 98. Therefore, the alignment guide 92 is used similarly to the alignment guide 28 described above for guiding movement of the wheels 46 on the mobile bin 14 when an operator positions the mobile bin 14 on top of the buffer unit 16.

A second part of the operation of the bulk adhesive transfer system 10 is shown in FIGS. 6 through 8B. After the mobile bin 14 has been filled at the bulk supply 12, the mobile bin 14 is moved by an operator from the bulk supply 12 to the buffer unit 16. In particular, the mobile bin 14 is rolled on the surface S using the wheels 46. Because the mobile bin 14 includes four wheels 46 supporting the entire periphery of the mobile bin 14, the operator does not need to tip the mobile bin 14 during this movement and so the risk of adhesive spills is minimized. When the mobile bin 14 approaches the buffer unit 16, the alignment guide 92 helps align the mobile bin 14, with the wheels 46 moving along the side rails 94a, 94b until the front most of the wheels 46 contact the stop rail 96. As described above with the other alignment guide 28, the stop rail 96 is positioned so that the front most wheels 46 abut the stop rail 96 when the valve 60 on the mobile bin 14 is aligned with the inlet 72 defined along the open top of the buffer bin 70. It will be understood that the lid member 77 should be moved to the open position before rolling the mobile bin 14 in position over the buffer bin 70.

Figure 8A:
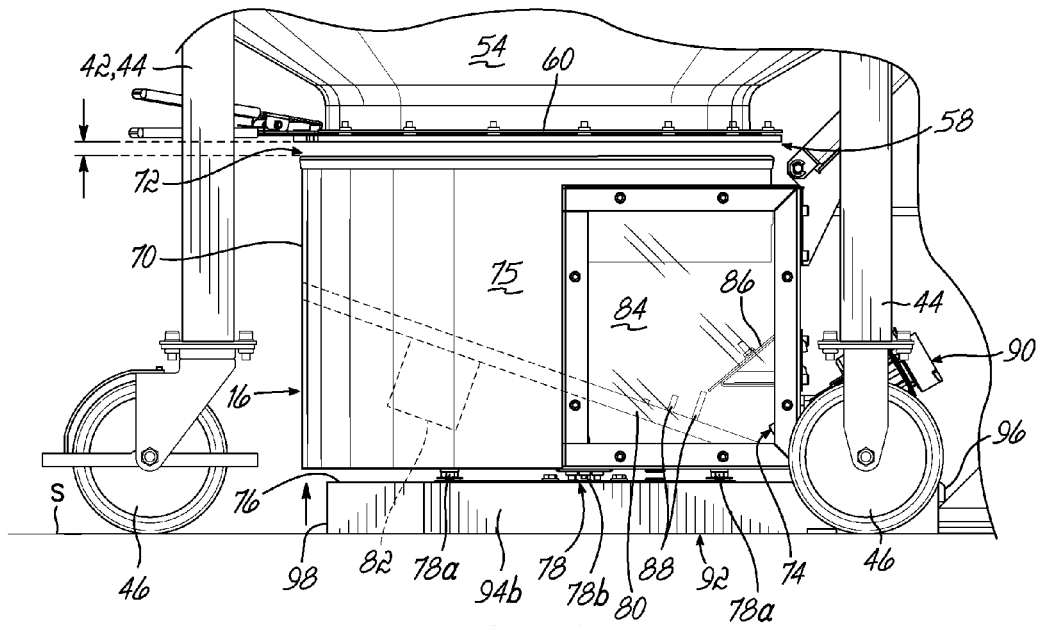
FIG. 8A is an enlarged view of a portion of FIG. 7, showing the mobile bin slightly separated from the buffer unit.
Figure 8B:
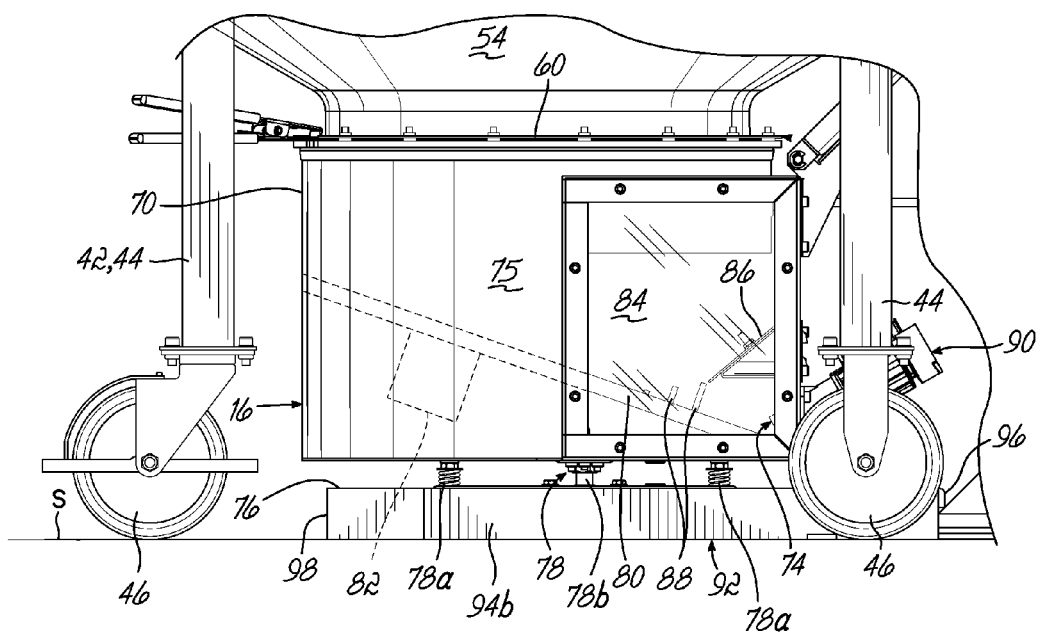
FIG. 8B is an enlarged view similar to FIG. 8A, showing the mobile bin moved into contacting engagement with the buffer unit.

Once the mobile bin 14 is appropriately positioned, the valve 60 of the mobile bin 14 is opened to direct adhesive particulate from the container 40 of the mobile bin 14 into the buffer bin 70 of the buffer unit 16. In particular, adhesive particulate are allowed to flow by gravity feed out of the outlet 58 of the container 40 and into the inlet 72 of the buffer bin 70. Before opening the valve 60, the buffer bin 70 may be mated with the container 40 by moving the buffer bin 70 upwardly (e.g., disengaging the air cylinder 78b so as to allow the compression springs 78a to force the buffer bin 70 from the spaced apart configuration shown in FIG. 8A into contacting engagement with the container 40 as shown in FIG. 8B. To this end, the valve 60 and bottom end of the mobile bin 14 define a docking structure for releasably attaching to the buffer bin 70. It will be understood that "dock" or "docking" is understood in this specification to refer to releasable attachment of two elements or assemblies, such as by latching elements, clamps, locking and unlocking means, etc.

Once the buffer bin 70 has been substantially filled, the valve 60 may be closed so that the mobile bin 14 can be moved away to other buffer units 16 or back to the bulk supply 12 when necessary. Alternatively, the mobile bin 14 may remain in position to continue feeding adhesive particulate into the buffer unit 16 until the mobile bin 14 is emptied. The valve 60 is preferably provided with multiple ports that sequentially open and close with a scissor-like interface at the ports to reliably ensure flow of adhesive particulate through the valve 60 when opened and to reliably cut through a column of stacked adhesive particulate without jamming or blocking during closing. One exemplary embodiment of the valve 60 and its specific operational functionality is described below in connection with FIGS. 9 through 11D.

After the buffer unit 16 is filled with adhesive particulate, this adhesive particulate can be directed to the melter device 18. While the adhesive particulates are in the buffer bin 70 and before they are directed to the melter device 18, the adhesive particulates can be agitated and/or fluidized for flow within the buffer bin 70 by the agitation device 82. In particular, the agitation device 82 can be used to vibrate the sloped internal plate 80, thereby agitating the adhesive particulates on and above the plate 80 as the adhesive particulates are directed toward the at least one outlet 74 of the buffer bin 70. The vibrational energy may also be transmitted to the housing 75 of the buffer bin 70 to further encourage movement of the adhesive particulate towards the at least one outlet 74. As described above, the gap defined by the flow control plate 86 and the vibrating/agitating plurality of pins 88 in the buffer bin 70 discourage large clumps of adhesive particulates from clogging the at least one outlet 74.

The pneumatic pumps 90 are actuated on demand for more adhesive at the melter device 18, and the adhesive particulate near the at least one outlet 74 is forced out of the buffer bin 70 and to the melter device 18 by the pneumatic pumps 90. Although the agitation device 82 may be operated more or less frequently, in a typical operation the agitation device 82 is run concurrently with or shortly after the pneumatic pumps 90 remove adhesive particulate from the buffer bin 70, thereby encouraging more fluidized adhesive particulate to flow into the space adjacent the at least one outlet 74. Once the buffer bin 70 runs low on adhesive particulate, the operator may move the mobile bin 14 back into position (if it was moved away) and re-open the valve 60 to refill the buffer bin 70. Accordingly, the melter devices 18 are reliably provided with adhesive particulate on demand by the buffer unit 16, and the buffer unit 16 is filled by a transfer device in the form of a mobile bin 14 that removes many of the risks of spilling adhesive, contaminating adhesive, and exposing an operator to adhesive dust when transferring adhesive particulate from the bulk supply 12 to the melter devices 18.

Consequently, this first embodiment of the bulk adhesive transfer system 10 enables a reliable supply of adhesive particulate to be delivered through the buffer unit 16 and to the melter device(s) 18 on demand. An operator can transfer the adhesive particulate from the bulk supply 12 to the buffer unit 16 and the melter devices 18 using the mobile bin 14, which is configured for easy movement on wheels and spill-free use during filling at the bulk supply 12 and during emptying at the buffer unit 16. The risks of operator exposure to adhesive dust and adhesive contamination are also minimized using this bulk adhesive transfer system 10. It will be understood that one or more of the components of the system 10 may be modified in other embodiments, specifically the transfer device as described in connection with FIGS. 12 through 15B below.

Referring next to FIGS. 9 through 11D, a rotary knife gate valve 110 is shown in detail, this rotary knife gate valve 110 being specifically tailored for advantageous operation as one or both of the valves 26, 60 described above at the outlet 24 of the bulk supply 12 and at the outlet 58 of the mobile bin 14. The rotary knife gate valve 110 is configured to provide a plurality of ports for adhesive particulate flow out of the corresponding container (bulk supply 12 or mobile bin 14), thereby avoiding problems with temporary bridging or "log jamming" of adhesive across a single port. Moreover, the rotary knife gate valve 110 is designed to sequentially close the plurality of ports with a scissor-like opening action to limit jamming and blockages that would increase the resistance to closing the rotary knife gate valve 110. These operational features of the rotary knife gate valve 110 are described in further detail below. It will be understood that the rotary knife gate valve 110 may be incorporated in multiple places in a bulk adhesive transfer system, such as system 10 described above, and in a corresponding hot melt adhesive dispensing system (e.g., the system 10 including the melter devices 18 and dispensing guns or modules).

With particular reference to the exploded view in FIG. 9 and the assembled views in FIGS. 10A and 10B, the rotary knife gate valve 110 generally includes a first plate 112 and a second plate 114 which cooperate together to define a plurality of ports that are selectively opened and closed sequentially as described in greater detail below. The second plate 114 overlies a majority of the first plate 112 and is configured to remain in abutting or contacting relation with the first plate 112. The plates 112, 114 are maintained in the abutting, cooperating relationship with one another by a collar 116, which covers only an outermost peripheral portion 112a of the first plate 112 and is affixed to the first plate 112 by a plurality of bolt fasteners 117 as shown. In the illustrated embodiment, the bolt fasteners 117 include a spacer 117a or washer that is sized to maintain a gap between the first plate 112 and the collar 116 sufficient to closely receive an outermost peripheral portion 114a of the second plate 114. The spacers 117a may also help maintain the second plate 114 in axial alignment with the first plate 112, although a central pivot bolt 119 may also be provided along a central axis CA of the first and second plates 112, 114 as shown in FIGS. 10A and 10B.

Therefore, the outermost peripheral portion 114a of the second plate 114 is sandwiched between the collar 116 and the outermost peripheral portion 112a of the first plate 112. As a result, flow of adhesive particulate through the rotary knife gate valve 110 must pass through each of the first and second plates 112, 114 during flow movement through the valve 110. The second plate 114 is mounted for free rotation about the central axis CA relative to the first plate 112, which is the movement that enables the various ports described below to be sequentially opened and closed. It will be understood that different fasteners or mechanisms may be provided to assemble the plates 112, 114 and collar 116 in other embodiments of the valve 110.

Figure 9:
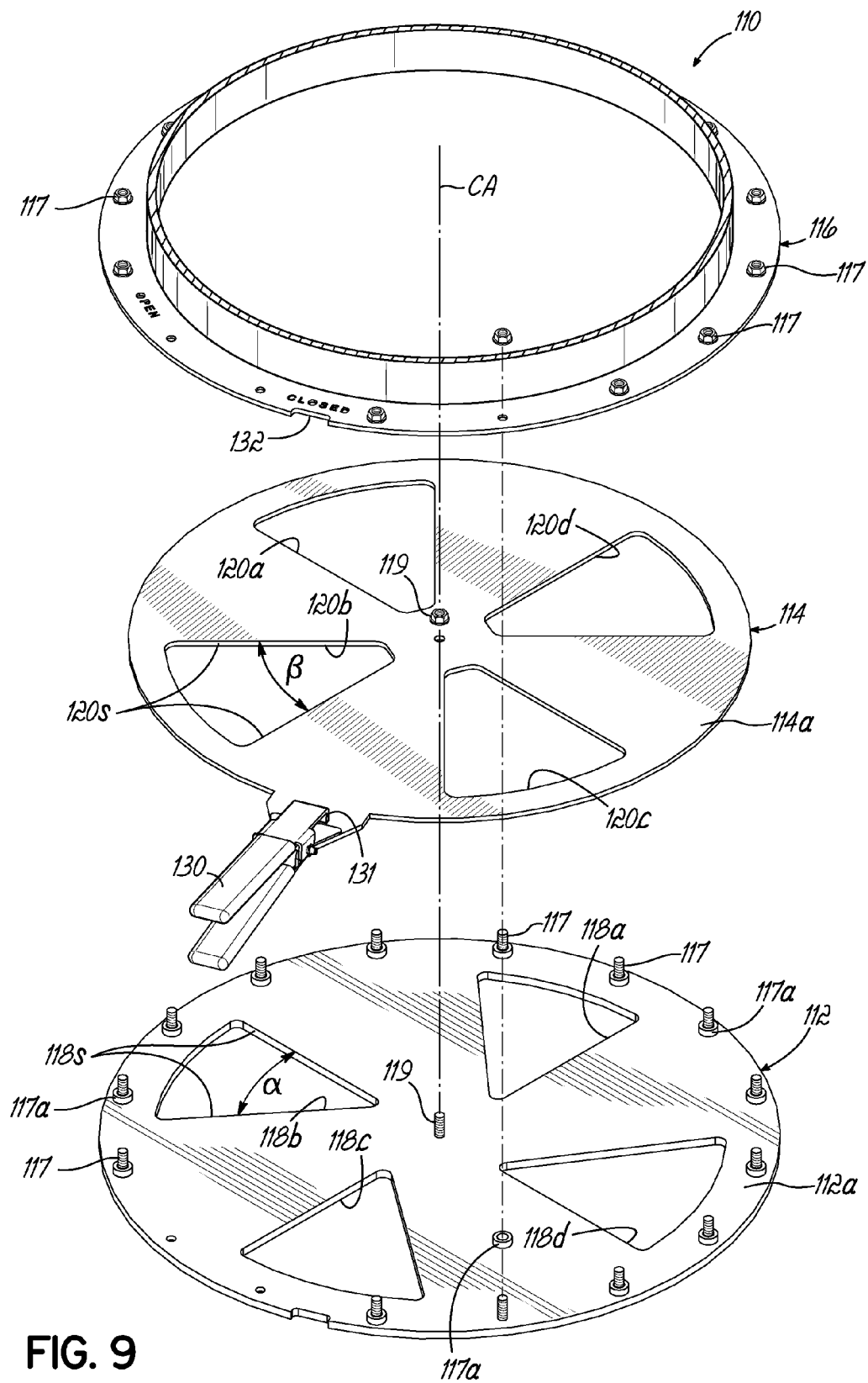
FIG. 9 is an isometric view showing features of a valve in a disassembled state.
Figure 10A:
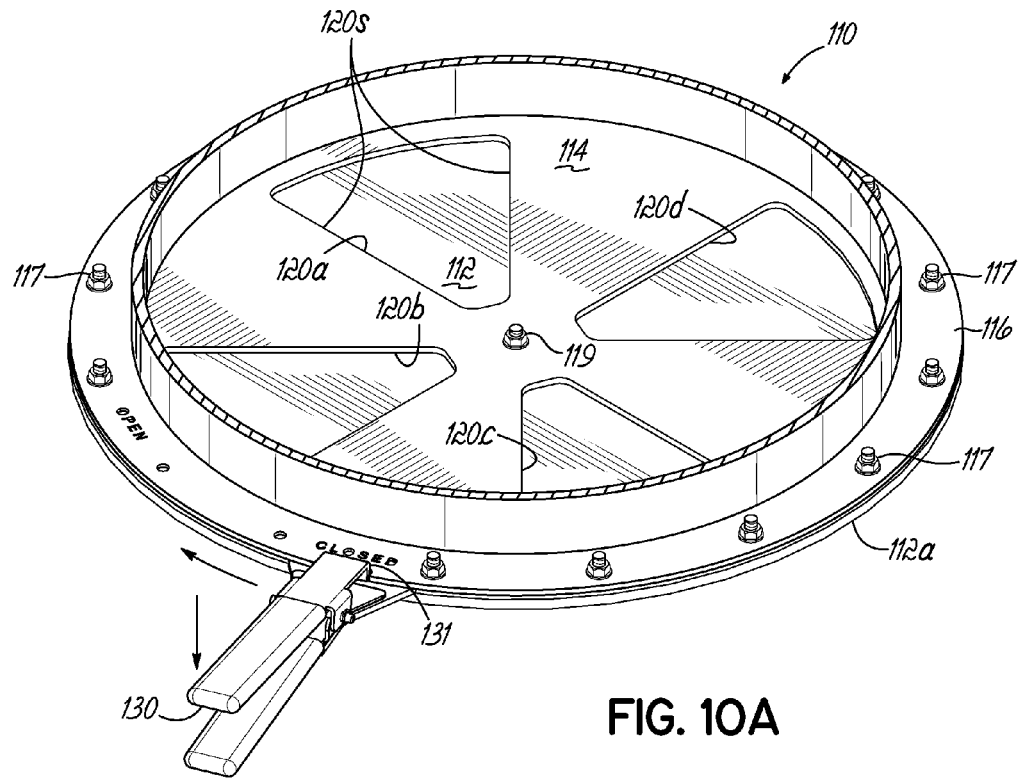
FIG. 10A is an isometric view showing the valve of FIG. 9 in a closed configuration.
Figure 10B:
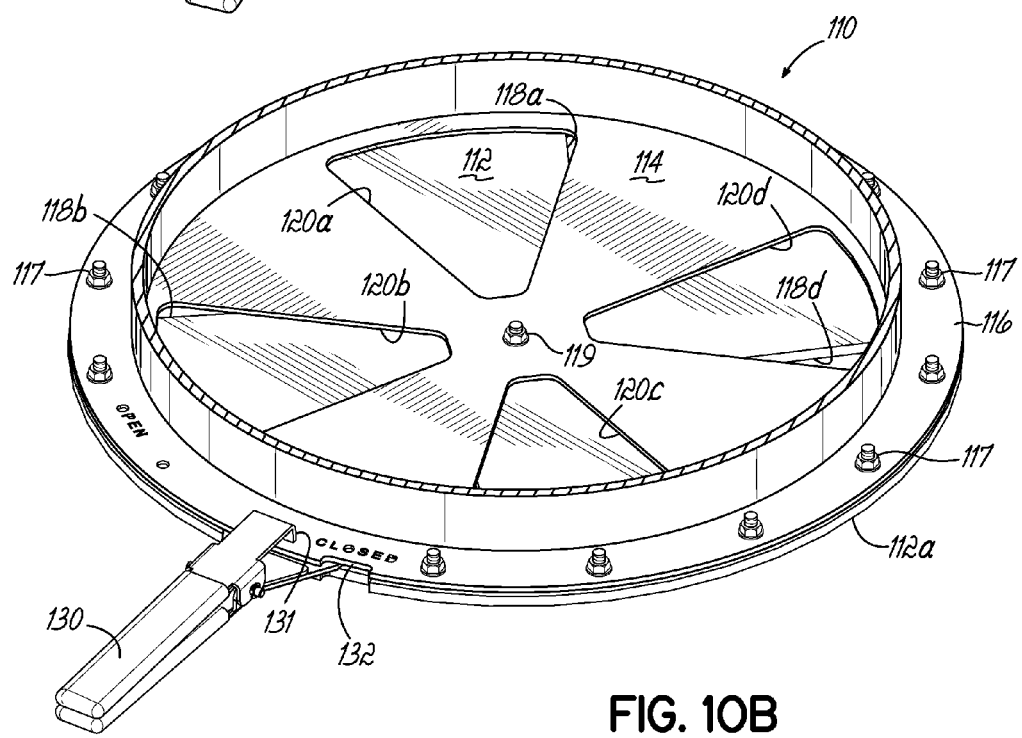
FIG. 10B is an isometric view showing the valve of FIG. 9 in a partially open configuration.

With continued reference to FIGS. 9 through 10B, the first plate 112 includes a plurality of first apertures designated 118a, 118b, 118c, and 118d. These apertures are generally radially arranged in a circular pattern around the first plate 112 and define triangular wedge shaped openings for flow through the first plate 112, with a base of the wedge shape located proximate to the outermost peripheral portion 112a of the first plate 112 and a point of the wedge shape located proximate to the center of the first plate 112. The apertures 118a, 118b, 118c, and 118d in the first plate 112 are not all the same size. In particular, 118a is the smallest, aperture 118b is larger than aperture 118a, aperture 118c is larger than aperture 118b, and aperture 118d is larger than aperture 118c. In this regard, the relative size of the wedge shaped apertures 118a, 118b, 118c, 118d may also be defined by the arc length or arc angle α extending/spanning between the opposing side edges 118s (e.g., the side edges 118s extending between the point of the wedge shape and the base of the wedge shape), this angle α being slightly larger in aperture 118b than in aperture 118a, slightly larger in aperture 118c than in aperture 118b, and slightly larger in aperture 118d than in aperture 118c. This arrangement of differently sized apertures 118a, 118b, 118c, 118d in the first plate 112 helps enable the advantageous sequential opening and closing of ports as set forth below in detail.

The second plate 114 also includes a plurality of second apertures designated 120a, 120b, 120c, and 120d. These apertures are generally radially arranged in a circular pattern around the second plate 114 and have frustum shaped openings (e.g., a truncated triangular wedge shape) for flow through the second plate 114, with a larger base of the frustum shape located proximate to the outermost peripheral portion 114a of the second plate 114 and a smaller base of the frustum shape located proximate to the center of the second plate 114. The apertures 120a, 120b, 120c, and 120d in the second plate 114 are all generally the same size. In this regard, the relative size of the wedge shaped apertures 120a, 120b, 120c, 120d may also be defined by the arc length or arc angle β extending/spanning between the opposing side edges 120s (e.g., the side edges 120s extending between the smaller base of the frustum shape and the larger base of the frustum shape), this angle β being identical for each of the apertures 120a, 120b, 120c, 120d.

The apertures 118a, 118b, 118c, and 118d in the first plate 112 and the apertures 120a, 120b, 120c, and 120d in the second plate 114 respectively cooperate to define a plurality of ports 122a, 122b, 122c, and 122d. Particularly, the ports 122a, 122b, 122c, 122d are formed/opened when an aperture of the first plate 112 is aligned with an aperture of the second plate 114, and the ports 122a, 122b, 122c, 122d are closed when the apertures of the first and second plates 112, 114 are misaligned. As shown in FIG. 9, the apertures 118a, 118b, 118c, 118d of the first plate 112 are separated by solid regions configured to align with the apertures 120a, 120b, 120c, 120d in the second plate 114 when the valve 110 is moved to the closed position. Likewise, the apertures 120a, 120b, 120c, 120d of the second plate 114 are also separated by solid regions that are configured to align with the apertures 118a, 118b, 118c, 118d of the first plate 112 when the valve 110 is moved to the closed position. Accordingly, a plurality of flow paths through the rotary knife gate valve 110 can be produced simply by rotating the second plate 114 through a relatively small angle of rotation (e.g., approximately 40-45 degrees) relative to the first plate 112 and the collar 116. The provision of multiple flow paths or ports 122a, 122b, 122c, 122d through the valve 110 reduces the likelihood that a temporary bridging or "log jamming" of adhesive particulate across any of the ports 122a, 122b, 122c, 122d will stop flow entirely through the valve 110, as sometimes occurs in single port valve designs, thereby enhancing the reliability of the valve 110 for use in the bulk adhesive transfer system 10.

Figure 11A:
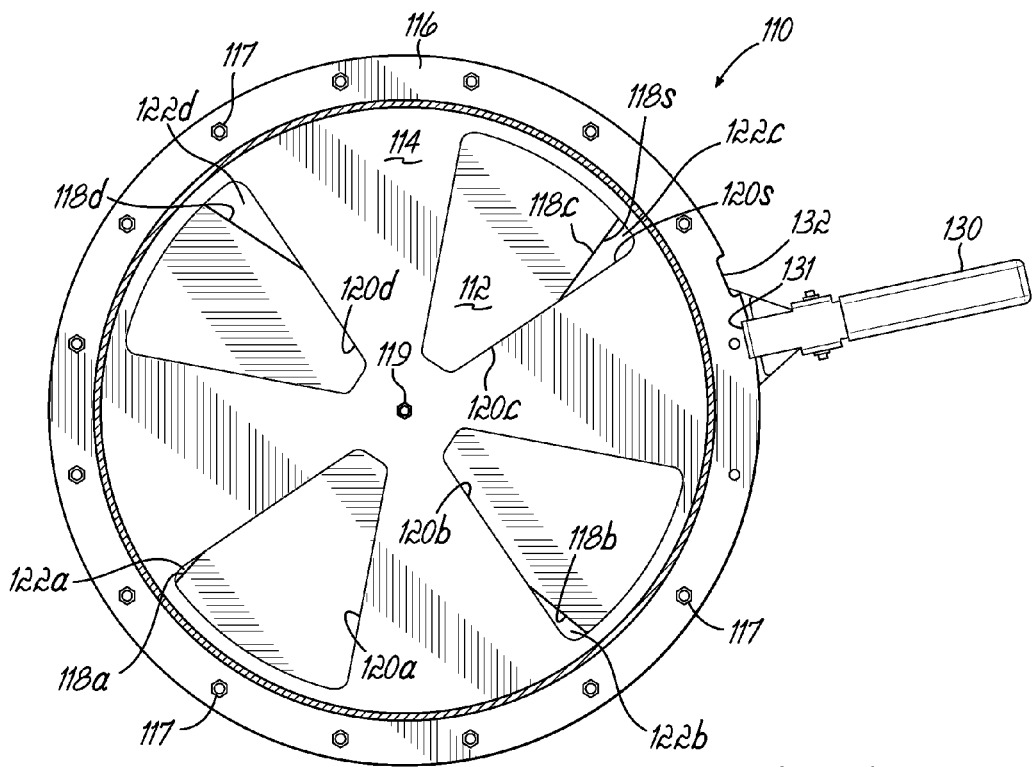
FIG. 11A is a plan view showing the valve of FIG. 9 in a first position during sequential closing of the ports of the valve (e.g., the partially open configuration of FIG. 10B).

Because the apertures 118a, 118b, 118c, 118d are differently sized, as discussed above, when the first and second plates 112, 114 are rotated relative to each other, the ports 122a, 122b, 122c, and 122d are sequentially opened or closed. For example, FIGS. 11A through 11D show a progression of operating positions of the rotary knife gate valve 110 during movement of the second plate 114 relative to the first plate 112 towards the closed position. It will be understood that the apertures 118a, 118b, 118c, 118d of the first plate 112 may be completely aligned with the apertures 120a, 120b, 120c, 120d in a fully opened position of the valve 110 not shown in these FIGS., and the initial position shown in FIG. 11A is only a partially opened position of the valve 110. In this partially opened position shown in FIG. 11A, all of the ports 122a, 122b, 122c, and 122d are at least partially open, but the difference in sizes of the apertures 118a, 118b, 118c, 118d in the first plate 112 causes a smaller opening to be defined through port 122a as compared to the opening defined through port 122b (and smaller than the even larger openings through ports 122c and 122d). Therefore, as illustrated in the following sequence of FIGS., the continued rotation of the second plate 114 towards the closed position (counterclockwise as viewed from the top down as shown in these FIGS.) will cause the ports 122a, 122b, 122c, 122d to be closed in order of the relative sizes of the apertures 118a, 118b, 118c, 118d, from smallest to largest.

Figure 11B:
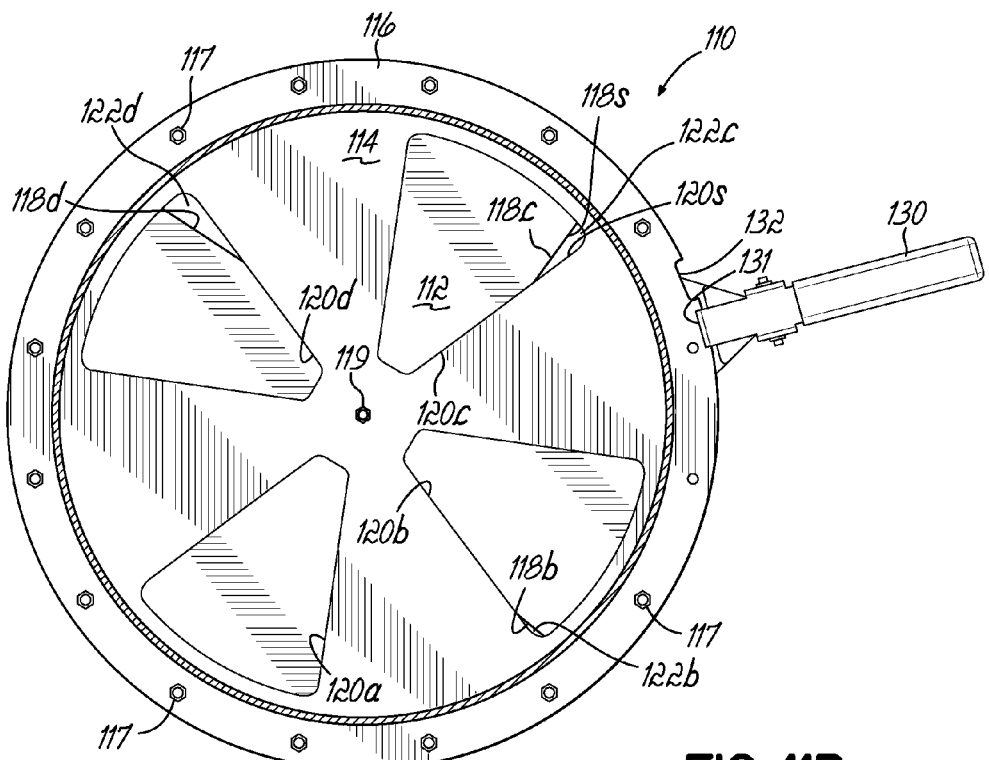
FIG. 11B is a plan view showing the valve of FIG. 11A in a second position during sequential closing of the ports of the valve.
Figure 11C:
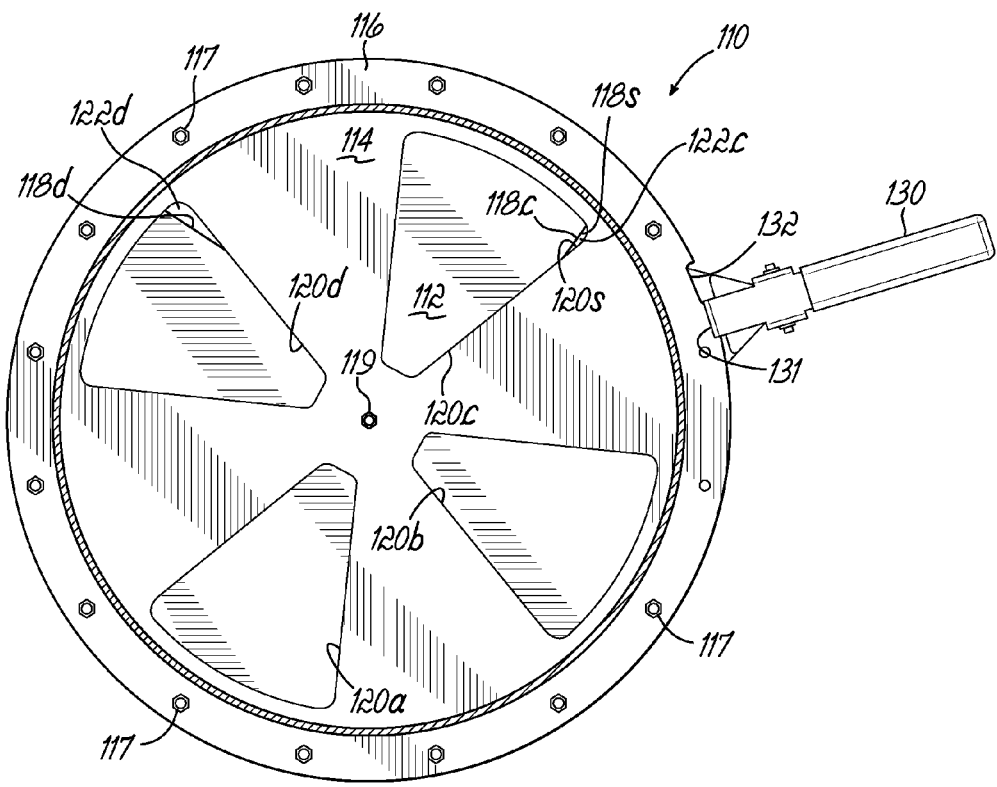
FIG. 11C is a plan view showing the valve of FIG. 11B in a third position during sequential closing of the ports of the valve.

To this end, the next position of the valve 110 during a closing operation is shown in FIG. 11B, in which port 122a is closed, and ports 122b, 122c, and 122d remain partially open. Each of the flow openings through the other ports 122b, 122c, 122d has become smaller as shown in FIG. 11B compared to the openings shown in FIG. 11A. Likewise, the next position of the valve 110 during a closing operation is shown in FIG. 11C, in which ports 122a and 122b are closed, and ports 122c and 122d remain partially open. Continued rotation of the second plate 114 will then result in the port 122c being closed (while the port 122d remains open) and then finally, the port 122d will close. This final position of the valve 110 is the closed position shown in FIG. 11D, in which all ports 122a, 122b, 122c, and 122d are closed. As a result of this sequential opening/closing design, only one of the plurality of ports 122a, 122b, 122c, 122d is being completely closed at one time. As a result, the rotational force that needs to be applied to the second plate 114 is significantly reduced compared to the alternative case where each of the ports 122a, 122b, 122c, 122d closes simultaneously (because the adhesive in the ports 122a, 122b, 122c, 122d would apply opposing torque forces at each opening being closed when done simultaneously, increasing the total resistance to closing movement by four times or more). Therefore, the rotary knife gate valve 110 is able to be easily opened and closed manually rather than requiring a high-torque motor to open and close the valve 110.

Figure 11D:
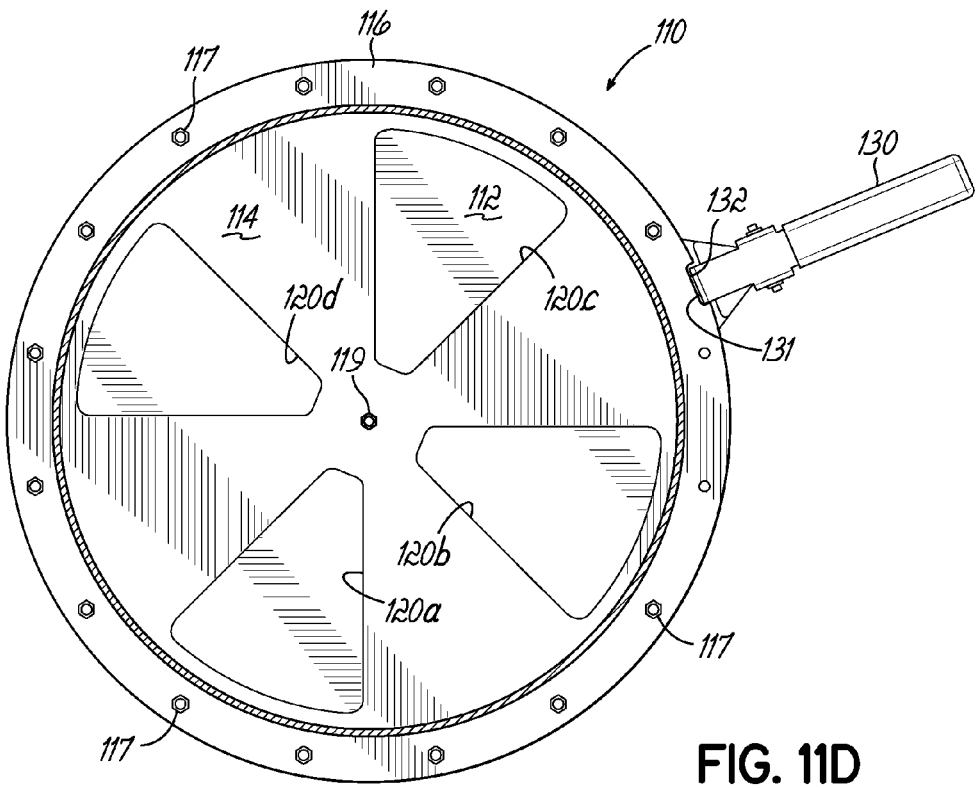
FIG. 11D is a plan view showing the valve of FIG. 11C in a fourth position during sequential closing of the ports of the valve. (e.g., the closed configuration of FIG. 10A).

Consequently, the rotary knife gate valve 110 of the illustrated embodiment also includes a handle 130 projecting radially outward beyond the outermost peripheral portion 114a of the second plate 114 to allow an operator to manually rotate the second plate 114 relative to the first plate 112. In addition, the collar 116 can include a locating notch 132 that receives and retains the handle 130 when all the ports 122a, 122b, 122c, and 122d are closed (e.g., when the valve 110 is in the closed position), as shown in FIG. 11D. The handle 130 of the illustrated embodiment is configured as a squeeze handle 130 including a latching end 131 that frictionally engages the collar 116 or the notch 132, except when the squeeze handle 130 is compressed as shown in FIG. 10B, which causes the latching end 131 to pivot upwardly away from the collar 116. It will be appreciated that the engagement of the latching end 131 and the notch 132 in the closed position can positively lock the handle 130 and the second plate 114 in the closed position until an intentional compression force is applied to the handle 130, thereby ensuring that the valve 110 is not opened until the operator desires this opening. The collar 116 may also include optional visual indicia indicating the fully opened and fully closed positions as shown in FIGS. 9 through 10B in some embodiments. As shown in FIGS. 9 through 11D, a couple of the bolt fasteners 117 connecting the collar 116 to the first plate 112 may optionally be removed along the arc length of travel (a partial rotation) for the handle 130 so that the handle 130 and second plate 114 can freely rotate between the open and closed positions of the valve 110, although this removal of fasteners 117 is not required in all embodiments.

Also as shown by the progressive sequence of positions defined by the valve 110 during closing in FIGS. 11A through 11D, the corresponding side edges 118s, 120s of the plurality of apertures 118, 120 in the first and second plates 112, 114 are not provided at the same angle relative to the central axis CA (e.g., the center of the first and second plates 112, 114). Instead, the side edges 118s, 120s are angled differently so that the point (radially innermost) end of the side edges 118s on the apertures 118a, 118b, 118c, 118d in the first plate 112 crosses underneath the corresponding side edge 120s on the apertures 120a, 120b, 120c, 120d before the base (radially outermost) end of the same side edges 118s crosses underneath the corresponding side edges 120s. Accordingly, each of the ports 122a, 122b, 122c, 122d closes with a progressive scissor-like action rather than having the two side edges 118s, 120s close along their entire lengths simultaneously. This scissor-like action at the closing of the ports 122a, 122b, 122c, 122d tends to push adhesive particulates in the ports 122a, 122b, 122c, 122d outwardly and out of the way rather than pinching the adhesive particulates in half, as typically happens when the two side edges 118s, 120s close along their entire lengths simultaneously. This potential pinching or cutting of the adhesive particulates can jam the ports 122a, 122b, 122c, 122d and make it significantly more difficult to close the valve 110, so the scissor-like action when closing each of the ports 122a, 122b, 122c, 122d improves the operation of the valve 110, especially when operated manually as shown.

As noted above, the rotary knife gate valve 110 can be used for either or both of the valves 26, 60 at the bulk supply 12 and at the mobile bin 14. Therefore, operation of those valves 26, 60 would include sequentially opening and sequentially closing the ports 122a, 122b, 122c, and 122d with the advantageous scissor-like action described above. In some instances, for example, such a valve could be used to interrupt a moving or nonmoving amount of adhesive particulate extending through the valve 110. For example, if the valve 110 were used on the mobile bin 14, the valve 110 might be used to close the ports 122a, 122b, 122c, and 122d before all the adhesive particulate are removed from the mobile bin 14 into the buffer unit 16. To this end, the valve 110 shown in these FIGS. advantageously enables easy manual opening and closing operation even when the valve 110 must effectively cut through a column of stacked adhesive particulate extending between the mobile bin 14 and the buffer unit 16, or between the bulk supply 12 and the mobile bin 14.

Figure 12:
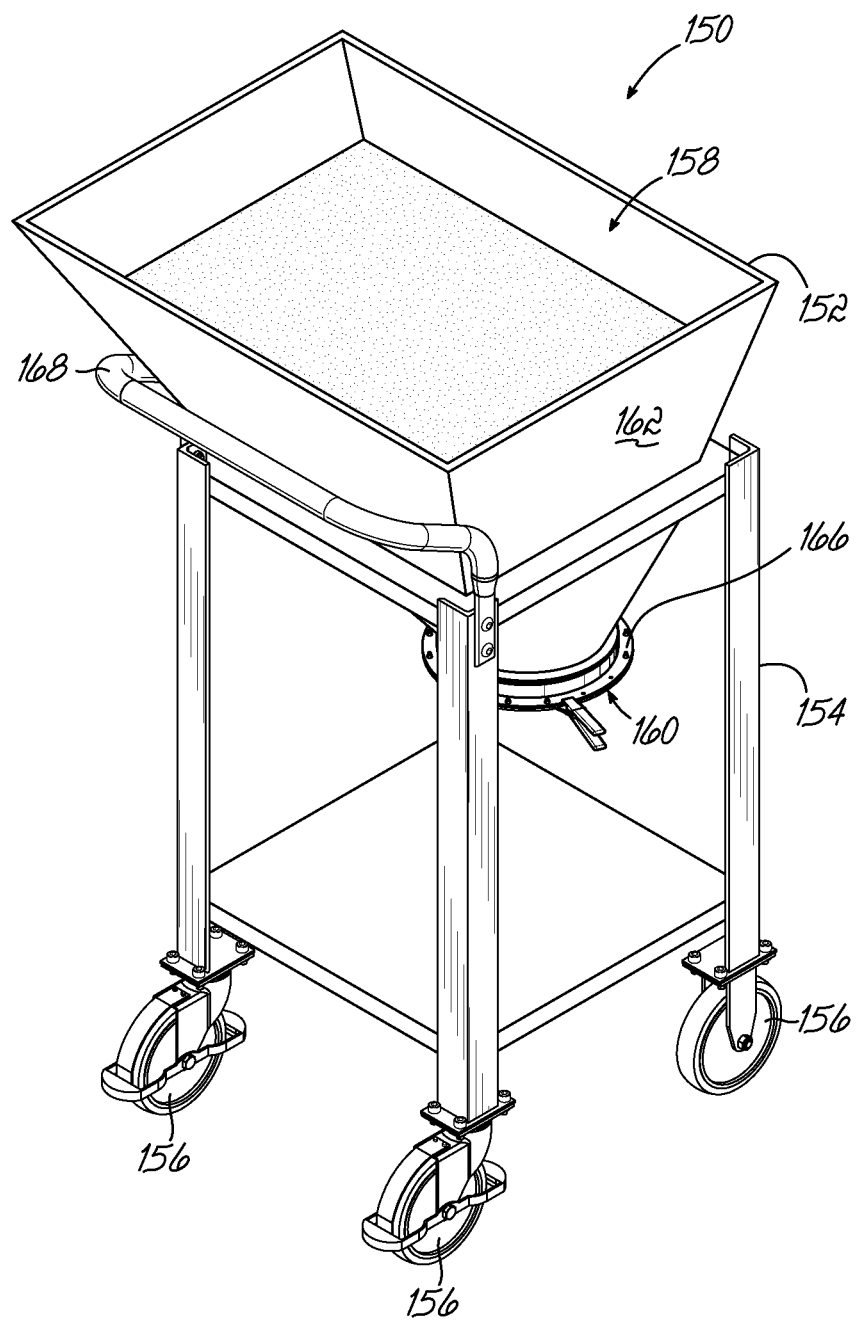
FIG. 12 is an isometric view showing a mobile bin according to a further embodiment of the bulk adhesive transfer device.
Figure 14:
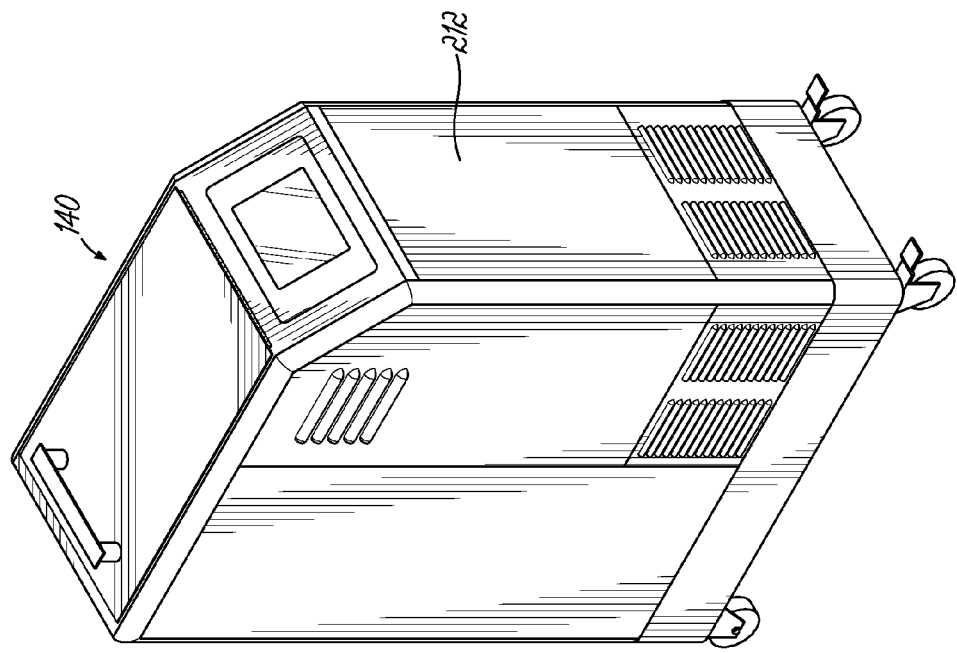
FIG. 14 is an isometric view showing melter of FIG. 13, with an enclosure installed.
Figure 13:
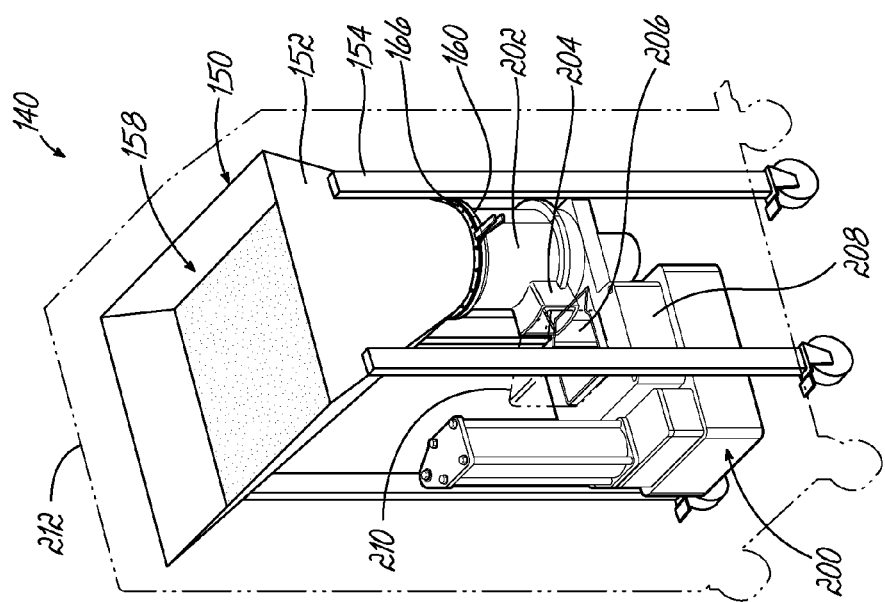
FIG. 13 is an isometric view showing a melter including the mobile bin of FIG. 12 docked thereto, with an enclosure in phantom.

As briefly discussed above, several alternative arrangements for transferring the adhesive particulate from a bulk supply to melt sections of melters are possible in accordance with the scope of this disclosure. To this end, the transfer device defined by the mobile bin 14 in the first embodiment of FIGS. 1 through 8B may be modified for the additional functionalities and benefits described below in other embodiments. Referring next to FIGS. 12 through 14, another embodiment of a melter 140 used with a hot melt adhesive dispensing system is shown. This embodiment of the melter 140 includes a transfer device 150 in the form of a modified mobile bin 150, and also includes a melt section 200. The melt section 200 includes a heating grid, reservoir, manifold and liquid adhesive pump, for example. The mobile bin 150 or transfer device of this embodiment is generally configured to receive adhesive particulate from the bulk supply 12 in a similar manner as the previously-described mobile bin 14. Instead of being configured to dock at a buffer unit 16 as previously described, the mobile bin 150 is configured to be selectively docked to the melt section 200 of the melter 140. In particular, the mobile bin 150 may be configured to selectively dock to the type of melt section shown in U.S. Patent Application Publication No. 2014/0102858, the content of which (relative to the melter and a feeder element described briefly below) is hereby incorporated by reference in its entirety. In this regard, the mobile bin 150 will effectively define a hopper for the melter 140, e.g., the mobile bin 150 is a part of the melter 140.

With particular reference to FIG. 12, the mobile bin 150 of this embodiment includes a container 152 connected to and supported by a framework 154 having at least one wheel 156, and in the embodiment shown includes four wheels 156 on four support members defining the framework 154. The wheels 156 enable rolling movement of the mobile bin 150 between the bulk supply 12 and the melt section 200. The container 152 has an inlet 158 configured to receive and hold a supply of adhesive particulate from the bulk supply 12, and an outlet 160 configured to provide adhesive particulate into an inlet defined by a feeder element 202 of the melt section 200 (shown in FIG. 13). Although the inlet 158 is shown as a completely open top to the container 152 in these FIGS., it will be understood that this inlet 158 may include a lid with an inlet port sized to engage the outlet 24 of the bulk supply 12 in some embodiments, in a similar manner as the mobile bin 14 described in connection with the first embodiment. The container 152 is defined by a body 162 having a shape configured to direct adhesive particulates toward the outlet 160, such as a generally tapered hopper shape shown in FIGS. 12 and 13. The mobile bin 150 is configured such that the outlet 160 may be positioned into docked engagement with the melt section 200 such that adhesive particulate can flow out of the outlet 160 of the mobile bin 150 and into the inlet of the melt section 200.

Additionally, the mobile bin 150 of this embodiment includes a valve 166 located at the outlet 160 of the container 152 and configured to selectively open and close the outlet 160 to control the flow of adhesive particulate out of the container 152. The valve 166 functions to close the outlet 160 of the mobile bin 150 whenever the mobile bin 150 is being moved, such as between the bulk supply 12 and the melt section 200, and this closure of the outlet 160 prevents adhesive particulate from the container 152 from being spilled during the movement of the adhesive particulate in the mobile bin 150. It will be understood that alternative mechanisms for opening and closing the outlet 160 may be provided in other embodiments of the transfer device defined by the mobile bin 150. Optionally, the valve 166 may be configured to automatically close when the mobile bin 150 is not docked with the melt section 200, and to automatically open when the mobile bin 150 is docked with the melt section 200. However, the valve 166 could be configured to be manually actuated between open and closed positions as well. Advantageously, the valve 166 includes a rotary knife gate valve as described above with reference to FIGS. 9 through 11D, thereby providing the advantageous operational benefits described above. The mobile bin 150 also includes a push handle 168 connected to the framework 154 and configured to provide a convenient ergonomic gripping point for an operator to push or pull the mobile bin 150 when moving the mobile bin 150 between the bulk supply 12 and the melt section 200.

The mobile bin 150 in this embodiment of the melter 140 is used in a generally similar manner as the mobile bin 14 discussed above. Once the mobile bin 150 receives adhesive particulate from the bulk supply 12, it is moved to a position proximate to the melt section 200, as shown in FIG. 13. The mobile bin 150 is then docked to the melt section 200 (e.g., releasably attached using known means such as clamps, latches, etc., not shown in the FIGS.) by connecting the outlet 160 of the mobile bin 150 to the feeder element 202 of the melt section 200, and adhesive particulate may then be directed from the container 152 into the melt section 200. It will be appreciated that in some embodiments, the outlet 160 of the mobile bin 150 is merely aligned with the feeder element 202 rather than being connected or docked thereto. When the outlet 160 is docked to the melt section 200, the valve 166 and bottom end of the container 152 effectively define the docking structure used to releasably connect to the feeder element 202 of the melt section 200.

As described in U.S. Patent Application Publication No. 2014/0102858, incorporated by reference above, the feeder element 202 includes internal agitation structure (not shown) configured to agitate any flow of adhesive particulate out of the outlet 160 to force this flow to move through a projection 204 of the feeder element 202 aligned with a top opening 206 in a heated portion 208 of the melt section 200. Also as described in detail in U.S. Publication 2014/0102858 (above), the top opening 206 includes an optional shroud 210 for guiding the flowing adhesive particulate from the projection 204 into the heated portion 208, where a heater grid or some other known heater structures are used to apply heat and melt the adhesive particulate into liquid adhesive which is then provided to dispensing guns or other similar elements by the melt section 200. Therefore, in the embodiments in which the mobile bin 150 is docked with the melt section 200, the feeder element 202 defines a docking structure at an inlet of the melt section 200 so as to enable selective disconnection and removal of the mobile bin 150 from the melt section 200. This disconnection and removal may be desired when the container 152 is emptied of adhesive particulate by the melt section 200 or even before the container 152 is emptied, if so desired. Advantageously, the melt section 200 continues operating to melt adhesive particulate and supply liquid adhesive even when the mobile bin 150 is undocked from the melt section 200. The mobile bin 150 can be refilled or replenished with adhesive particulate at the bulk supply 12 and replaced, or a similar second mobile bin 150 filled with adhesive particulate can be docked to the melt section 200 to replace the empty initial mobile bin 150, all without interrupting operation of the melt section 200.

When the container 152 of the mobile bin 150 operates as a hopper of the melter 140 as shown in these FIGS., it will be understood that the hopper is preferably unheated, but may be heated without departing from the functionality of this embodiment of the invention. The removable hopper concept for a melter 140 improves the functionality of this and other melters 140 by avoiding the problems with hand scoop-based manual filling of known hoppers rigidly connected to known melters while eliminating the need for pneumatic transfer or filling devices. Furthermore, the removable hopper or transfer device can be even further simplified or modified in other embodiments, such as those described below in connection with FIGS. 15A and 15B.

As shown in phantom in FIG. 13 and in solid in FIG. 14, the melt section 200 of this embodiment also includes an enclosure 212 that shields the heated portion 208 of the melt section 200 from operators and the outside environment, while also optionally mounting the melt section 200 on wheels. The mobile bin 150 and specifically the moveable unit defined by the container 152 and the outlet 160 are sized so as to fit completely within the enclosure 212 of the melt section 200 when the mobile bin 150 is docked with or moved into alignment with the melt section 200. In other words, FIGS. 13 and 14 show the mobile bin 150 moved inside the confines of the enclosure 212. For example, part or all of the enclosure 212 may be temporarily removed when the mobile bin 150 is docked to the melt section 200. The enclosure 212 may thereafter be reinstalled (similar to what is shown in FIG. 14) to continue protecting the operator and any equipment/personnel in the area of the melt section 200 from heat energy produced by the melt section 200. Alternatively, the mobile bin 150 can include part of an enclosure that when docked to the melt section 220 defines a part of the enclosure 212 in other embodiments.

In some versions of this embodiment, the container 152 (and possibly the feeder element 202 as described below) is selectively separable from the framework 154 and the remainder of the mobile bin 150. For example, the framework 154 having wheels 156 can be used to transport the container 152 to and from the bulk supply 12, so that adhesive particulates can be put into the container 152. Once the container 152 are docked with the melt section 200, the framework 154 can optionally be separated from the container 152 and moved away therefrom. In such versions of this embodiment, it is unnecessary to fit the entire framework 154 inside the enclosure 212 of the melt section 200. In view of the simplified mechanism (e.g., the mobile bin 150) for transferring the adhesive particulate from the bulk supply 12 to the melt section 200, this embodiment of the melter 140 provides the same benefits described above as the first embodiment, including but not limited to minimized risk of operator exposure to adhesive dust and minimized risk of adhesive contamination or spillage during transfer.

Figure 15A:
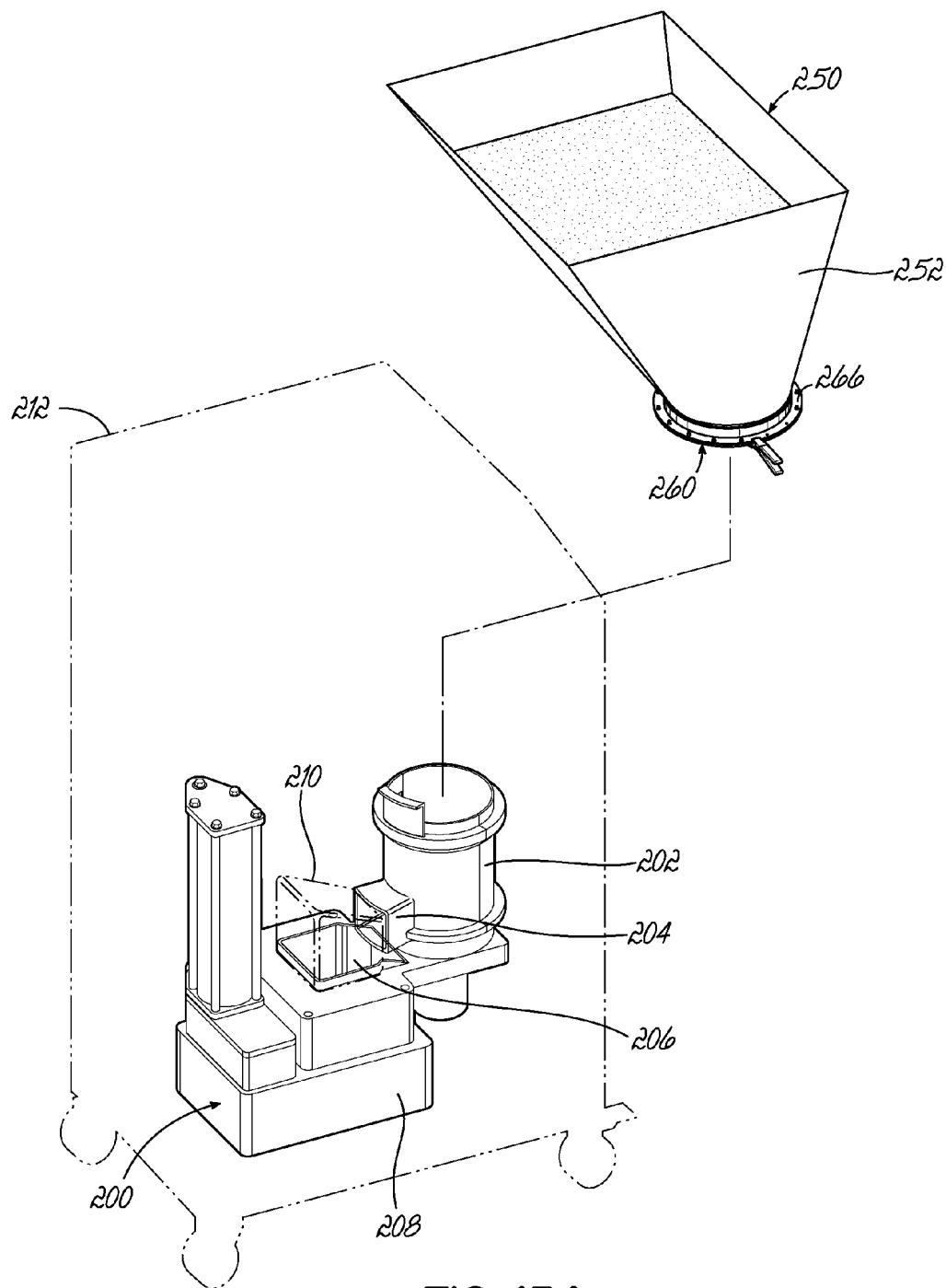
FIG. 15A is a perspective view of another embodiment of a melter including a transfer device, with a container of the device shown in a removed state from a melt section, the container including a valve at the outlet thereof.

With reference to FIG. 15A, another embodiment of a transfer device 250 defining part of a melter is shown for use with the melt section 200 of the previous embodiment. This transfer device 250 is effectively the mobile bin 150 with the framework 154 removed, as alluded to in the alternative embodiment of the previous paragraph. More particularly, the transfer device 250 includes a container 252 configured to hold a supply of the adhesive particulate from the bulk supply 12 and an outlet 260 associated with the container 252. In order to prevent adhesive spillage during movement of the transfer device 250 between the bulk supply 12 and the melt section 200, a valve 266 such as the knife gate valve described above is associated with the outlet 260 and controls flow of adhesive particular from the container 252 by selectively opening and closing the outlet 260. As shown by phantom lines connecting the exploded apart structures in FIG. 15A, the transfer device 250 is configured to be moved by an operator into alignment with the feeder element 202 of the melt section 200, and the outlet 260 and valve 266 are understood to define docking structure for docking to the feeder element 202 in this embodiment. As with the previous embodiment, the transfer device 250 may be positioned within an enclosure 212 of the melt section 200 when these elements are docked together. Furthermore, the transfer device 250 continues to provide the advantageous benefits of a removable and refillable/replaceable hopper for the melter, the removal and replacement of the hopper being conducted while the melt section 200 continues to operate in continuous fashion. Also as with the previous embodiment, the same refilled transfer device 250 can be docked to the melt section 200 or a second replacement transfer device 250 that is already filled with adhesive particulate may be docked in place of the original transfer device 250. As clearly evidenced in this embodiment, the container 252 and the outlet 260 collectively define a removable or moveable unit that can be moved by an operator to the melt section 200 for supplying adhesive particulate and that can be moved away from the melt section 200, such as when the container 252 is emptied of adhesive particulate by the melt section 200.

Figure 15B:
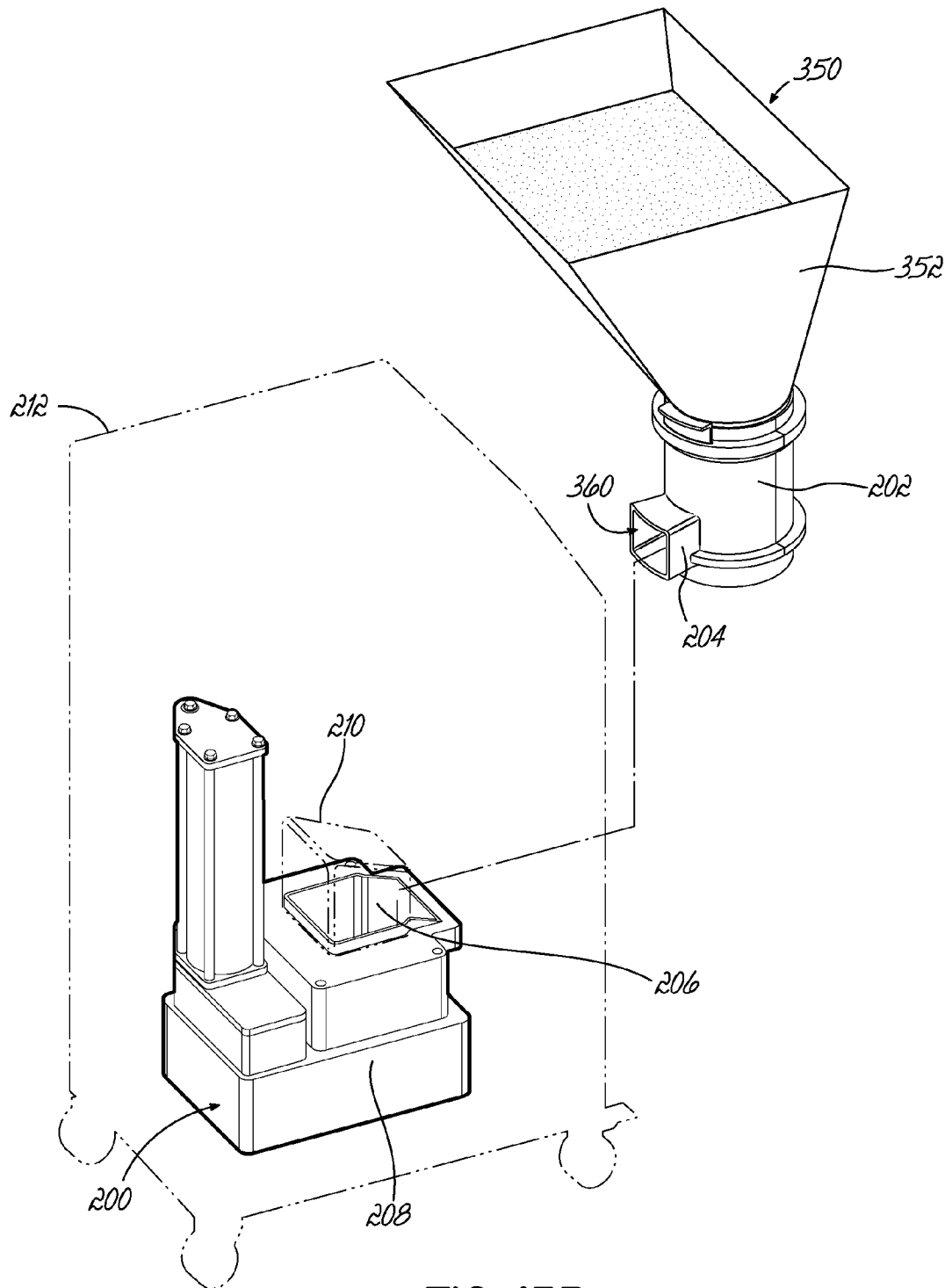
FIG. 15B is a perspective view of yet another embodiment of a melter including a transfer device, with a moveable unit defined by a container and a feeder element at the outlet thereof shown in a removed state from a melt section.

A slightly modified embodiment of the transfer device 350 defining part of a melter is shown in FIG. 15B. The only difference in this embodiment of the transfer device 350 compared to the previous embodiment (transfer device 250) is that the feeder element 202 is now incorporated into the moveable unit of the transfer device 350 rather than the melt section 200. Therefore, the inlet and/or docking structure of the melt section 200 in this embodiment is defined by the top opening 206 into the heated portion 208 and its associated optional shroud 210. Meanwhile, the outlet 360 of the transfer device 350 is now defined by the projection 204 on the feeder element 202. The knife gate valve device used in previous embodiments can be dispensed with between the container 352 and the feeder element 202 because the feeder element 202 controls flow through the outlet 360 (e.g., selectively opens and closes the outlet 360) by selectively agitating the adhesive particulate with the internal agitation elements not shown in these Figures. As with the previous embodiments, the transfer device 350 can function as a removable hopper of the melter and this removal can be conducted during continuous operation of the heated portion 208 of the melt section 200. Likewise, the transfer device 350 is easily aligned with or docked to the inlet defined by the melt section 200, thereby simplifying the process for refilling a hopper on the melter.

Consequently, in each of the embodiments of the bulk adhesive transfer system or device described above, one or more mechanisms that may be described as defining a transfer assembly are provided to help transfer and control flow of adhesive particulate between a bulk supply 12 and a melter (and indeed, may define a part of the melter). For example, the first embodiment of the transfer system 10 includes a transfer assembly having the valve 26, the mobile bin 14, and the buffer unit 16 in combination. Regardless of the particular structures defining the transfer assembly, these mechanisms avoid the need for an operator to manually transfer adhesive particulate from one remote location to another using manual scoops of adhesive or wheeled totes that may be difficult to control when completely filled. Accordingly, the risks of operator exposure to adhesive dust and the risks of adhesive spillage and contamination during transfer to the melter are minimized when using any of the bulk adhesive transfer systems or devices. Furthermore, the use of the removable transfer devices enables continuous operation of melter even during a refilling or replacement operation.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A method of providing adhesive particulate in a hot melt adhesive dispensing system using a transfer device that includes a container and an outlet, the container configured to hold a supply of the adhesive particulate and to operate as a removable hopper of a melter, the method comprising:
   moving the transfer device towards a melter of the hot melt adhesive dispensing system when the container is filled with adhesive particulate;
   aligning the transfer device to an inlet of the melter and releasably docking the transfer device to the melter by connecting the outlet of the transfer device to the inlet of the melter;
   opening the outlet of the transfer device to direct the adhesive particulate from the hopper to the melter so that unmelted hot melt adhesive particulate flows out of the outlet of the transfer device and into the inlet of the melter; and
   closing the outlet of the transfer device and removing the hopper from the melter.

2. The method of claim 1, wherein removing the hopper from the melter comprises:
   undocking the transfer device from the melter to enable movement of the transfer device away from the melter when the container is in need of adhesive particulate.

3. The method of claim 2, further comprising:
   replacing the transfer device with a second transfer device including a second container configured to hold an additional supply of the adhesive particulate, the second transfer device configured to be docked with the melter to provide the additional supply of the adhesive particulate to the melter after the undocking of the transfer device with the container in need of adhesive particulate.

4. The method of claim 2, further comprising:
moving the transfer device to a bulk supply to replenish the container with additional adhesive particulate; and
redocking the transfer device containing the additional adhesive particulate to the melter.

5. The method of claim 1, wherein:
the hopper is operatively coupled to a melt section of the melter for providing adhesive to the melt section, and
the method further comprises selectively removing the hopper from the melt section and replenishing the hopper with adhesive particulate.

6. The method of claim 5, further comprising:
continuing to operate the melt section of the melter during removal of the hopper from the melt section.

7. The method of claim 1, wherein:
the melter comprises a melt section contained within an enclosure, and
the method further comprises positioning the transfer device within the enclosure with the melt section so that the container and the melt section are within the enclosure.

8. The method of claim 1, wherein:
the transfer device comprises a framework supporting the container and at least one wheel such that the transfer device collectively defines a mobile bin, and
moving the transfer device comprises rolling the mobile bin using the at least one wheel, such that the container is moved without requiring manual lifting of the adhesive particulate by an operator.

9. The method of claim 8, wherein:
a buffer unit is operatively coupled to the melter and is configured to hold a supply of the adhesive particulate for delivery to the melter, and
docking the transfer device to the melter comprises engaging the mobile bin with the buffer unit such that adhesive particulate in the mobile bin may be delivered from the outlet into the buffer unit.

10. The method of claim 9, further comprising:
selectively removing the mobile bin from the buffer unit and replenishing the container of the mobile bin with adhesive particulate while the melter continues to operate, the buffer unit continuing to supply adhesive particulate into the melter during this selective removal of the mobile bin.

11. The method of claim 1, wherein:
the transfer device further comprises a valve device located at the outlet, and
opening the outlet of the transfer device comprises operating the valve device between open and closed positions to selectively allow the adhesive particulate to flow out of the transfer device.

12. The method of claim 1, wherein:
the transfer device further comprises a feeder element located at the outlet, and
opening the outlet of the transfer device comprises agitating the adhesive particulate with the feeder element to selectively generate a flow of the adhesive particulate out of the transfer device.

* * * * *